(12) United States Patent
Liang et al.

(10) Patent No.: US 12,261,820 B2
(45) Date of Patent: Mar. 25, 2025

(54) METHOD FOR CONNECTION BETWEEN DEVICES, ELECTRONIC DEVICE, AND COMPUTER-READABLE STORAGE MEDIUM

(71) Applicant: Huawei Technologies Co., Ltd., Shenzhen (CN)

(72) Inventors: Yong Liang, Shenzhen (CN); Yufeng Mao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/249,466

(22) PCT Filed: Oct. 15, 2021

(86) PCT No.: PCT/CN2021/124006
§ 371 (c)(1),
(2) Date: Apr. 18, 2023

(87) PCT Pub. No.: WO2022/083507
PCT Pub. Date: Apr. 28, 2022

(65) Prior Publication Data
US 2023/0370420 A1   Nov. 16, 2023

(30) Foreign Application Priority Data
Oct. 20, 2020   (CN) ........................ 202011124452.2

(51) Int. Cl.
*H04L 61/5014* (2022.01)
*H04L 67/104* (2022.01)
*G06F 13/42* (2006.01)

(52) U.S. Cl.
CPC ........ *H04L 61/5014* (2022.05); *H04L 67/104* (2013.01); *G06F 13/4282* (2013.01); *G06F 2213/0042* (2013.01)

(58) Field of Classification Search
CPC ............... H04L 61/5014; H04L 67/104; G06F 13/4282; G06F 2213/0042
See application file for complete search history.

(56) References Cited

U.S. PATENT DOCUMENTS

| | | | | |
|---|---|---|---|---|
| 2011/0145445 A1* | 6/2011 | Malamant | ............... | G06F 1/325 710/316 |
| 2011/0188391 A1* | 8/2011 | Sella | ................... | H04W 74/085 370/252 |

(Continued)

OTHER PUBLICATIONS

Anonymous: "Android USB Tethering," Aug. 7, 2020, XP093118784, 7 pages.

(Continued)

*Primary Examiner* — Dhairya A Patel
(74) *Attorney, Agent, or Firm* — Conley Rose, P.C.

(57) ABSTRACT

In a method for connection between a first electronic device and a second electronic device using a Universal Serial Bus (USB) system of the first electronic device, the first electronic device enables a first connection mode. The first electronic device allocates Internet Protocol (IP) addresses to the first electronic device and the second electronic device and the first electronic device disables transmitting data received using the USB system to a mobile communications system of the first electronic device.

20 Claims, 12 Drawing Sheets

(56) References Cited

U.S. PATENT DOCUMENTS

| | | | |
|---|---|---|---|
| 2012/0324067 A1* | 12/2012 | Hari | G06F 8/38 |
| | | | 709/222 |
| 2013/0148568 A1* | 6/2013 | Iimori | H04W 48/18 |
| | | | 370/315 |
| 2014/0215557 A1* | 7/2014 | Vishnubhatt | H04L 63/10 |
| | | | 726/3 |
| 2015/0351004 A1* | 12/2015 | Ko | H04W 4/80 |
| | | | 455/434 |
| 2017/0070281 A1* | 3/2017 | Gambhir | H04W 76/23 |
| 2019/0320349 A1* | 10/2019 | Xia | H04W 88/06 |

OTHER PUBLICATIONS

Smith, Yaakov: "Thunderbolt Networking," May 16, 2017, XP093118646, 7 pages.

* cited by examiner

METHOD FOR CONNECTION BETWEEN DEVICES, ELECTRONIC DEVICE, AND COMPUTER-READABLE STORAGE MEDIUM

CROSS-REFERENCE TO RELATED APPLICATIONS

This is a U.S. National Stage of International Patent Application No. PCT/CN2021/124006 filed on Oct. 15, 2021, which claims priority to Chinese Patent application No. 202011124452.2 filed on Oct. 20, 2020, both of which are hereby incorporated by reference in their entireties.

TECHNICAL FIELD

This application relates to the field of communications technologies, and specifically, to a method for connection between devices, an electronic device, and a computer-readable storage medium.

BACKGROUND

With the popularization of all-scenario devices, collaborative work between a plurality of devices has become a trend.

Multi-screen collaboration is a distributed technology that aims to implement cross-system and cross-device collaboration and implement resource sharing and collaborative operations through connection between a mobile phone and a computer or a tablet. In the multi-screen collaboration, files are transferred between the tablet/computer and the mobile phone, and computing capabilities and professional system capabilities of the tablet/computer are used to implement seamless collaboration between the tablet/computer and the mobile phone. A keyboard and a mouse are used as peripherals of the mobile phone, and tasks of two devices such as sending WeChat messages and replying emails can be performed on a large-screen device. In addition, more applications can be implemented by using a more professional application ecosystem of the tablet/computer.

A method for implementing multi-screen collaboration between devices includes a wired method. For example, connection and communication is performed based on a USB protocol through a USB connection cable. However, in the method, IP layers cannot be connected, and therefore a data transmission speed cannot meet a requirement.

SUMMARY

In view of this, this application provides a method for connection between devices, used for connection between a first electronic device and a second electronic device by using a USB module of the first electronic device, where an IP layer of the first electronic device and an IP layer of the second electronic device can be connected by virtualizing the first electronic device into a USB network adapter, so that data transmission between the first electronic device and the second electronic device can be faster, and a path for the second electronic device to access the Internet by using a mobile communications module of the first electronic device, for example, a cellular module or a Wi-Fi module is disconnected, to prevent the second electronic device from squatting data by using a network of the first electronic device to access the Internet.

The first electronic device may be any terminal device that has a USB port and a mobile communications module and that can implement IP layer communication, for example, a mobile phone or a tablet computer. The second electronic device may be any terminal device that has a USB port and that can implement IP layer communication, for example, a mobile phone, a tablet computer, a notebook computer, a desktop computer, a smart television, or a large-screen television. In other words, the first electronic device may also be any one of the second electronic device. That is, the method for connection between devices in this application, for example, may be performed between a mobile phone and a mobile phone, or may be performed between a mobile phone and a notebook computer.

The following describes this application from a plurality of aspects. For implementations and beneficial effects of the following plurality of aspects, reference may be made to each other.

According to a first aspect, this application provides a method for connection between devices, used for connection between a first electronic device and a second electronic device by using a USB module of the first electronic device, and including: The first electronic device enables a first connection mode, where the first connection mode is used to perform IP layer connection between the first electronic device and the second electronic device; the first electronic device allocates IP addresses to the first electronic device and the second electronic device; the first electronic device receives data from the second electronic device; and the first electronic device stops transmitting the data to a mobile communications module of the first electronic device.

According to the method for connection between devices according to this application, when the first connection mode (the first connection mode is denoted as a USB P2P mode below) is enabled, the USB is used to connect the first electronic device and the second electronic device, and the IP addresses are allocated, to connect an IP layer of the first electronic device to an IP layer of the second electronic device, thereby implementing IP layer communication. In addition, the data that is received from the second electronic device by using the USB module is stopped from being transmitted to the mobile communications module of the first electronic device, that is, a request for sharing a mobile network of the first electronic device sent by the second electronic device is stopped from being forwarded to the mobile communications module of the first electronic device, to prevent the second electronic device from accessing the Internet by using the network of the first electronic device. That is, the USB P2P mode is a connection mode in which IP layer connection is implemented between the first electronic device and the second electronic device, and the network is not shared between the first electronic device and the second electronic device.

In a possible implementation of the first aspect, the first electronic device allocates, by using the USB module, the IP addresses to the first electronic device and the second electronic device based on a DHCP function.

The DHCP (Dynamic Host Configuration Protocol, dynamic host configuration protocol) is a network protocol used in a local area network. A server controls an IP address range. When a client logs in to the server, the client can automatically obtain an IP address and a subnet mask allocated by the server. The DHCP is usually used in a large local area network to centrally manage and allocate IP addresses. It enables a host in the network to dynamically obtain an IP address, a gateway address, and a DNS server address, thereby improving address usage. The DHCP uses a client/server model. The dynamic allocation of addresses of the host is driven by a network host. When receiving information about applying for the address from the network host, the DHCP server sends relevant information such as address configuration to the network host, to implement dynamic configuration of the address information of the network host. The DHCP uses a UDP as a transmission protocol. The host sends a request message to the DHCP server, and the DHCP server returns a response message to the host.

Software that performs the DHCP includes, but is not limited to, DNSmasq software. DNSmasq is a compact and convenient tool for configuring DNS and DHCP. It is designed for a small network, providing DNS functions and optional DHCP functions. It serves domain names that are only locally applicable and do not appear on global DNS servers. DNSmasq stores Internet addresses and a mapping relationship between addresses and domain names in the cache, reducing the server load and improving performance (especially in modem connections). In addition, DNSmasq can be configured to automatically obtain address information from an upstream DNS server using PPP or DHCP configuration requests. If the information changes, the information will be automatically reloaded.

In a possible implementation of the first aspect, the method further includes: displaying, on the second electronic device, a desktop of the first electronic device through screen mirroring, to implement multi-screen collaboration between the first electronic device and the second electronic device. In other words, the method for connection between devices in the first aspect of this application may be used to implement multi-screen collaboration between the devices.

In a possible implementation of the first aspect, the first electronic device includes any one of a mobile phone or a tablet computer, and the second electronic device includes any one of a mobile phone, a tablet computer, a notebook computer, a desktop computer, or a smart television. That is, the method for connection between devices according to this application may be used for connections between a mobile phone and any one of a mobile phone, a tablet computer, a notebook computer, a desktop computer, a smart television, or the like, or may be used for connections between a tablet computer and any one of a mobile phone, a notebook computer, or the like.

In a possible implementation of the first aspect, the allocating, by using the USB module, the IP addresses to the first electronic device and the second electronic device includes: enabling, by the first electronic device, the USB module to work in an RNDIS mode, to virtualize the first electronic device into a network adapter; allocating the IP addresses to the USB module based on the DHCP function; and allocating, by the USB module, the IP addresses to the first electronic device and the second electronic device respectively.

That is, the first electronic device is first virtualized into the USB network adapter, and then the IP addresses are allocated, by using the USB module, to the first electronic device and the second electronic device respectively based on the DHCP function. In this way, the IP layer connection is implemented between the first electronic device and the second electronic device.

The virtualizing the first electronic device into the USB network adapter may be implemented based on RNDIS (Remote Network Driver Interface Specification, remote network driver interface specification), and specifically, may be implemented by setting the USB module of the first electronic device to an RNDIS mode. In essence, TCP/IP is run on the first electronic device by using the USB module, so that the first electronic device looks like a network adapter. Currently, a mobile phone, a tablet computer, a smartwatch, and a computer can all be implemented as a USB virtual network adapter based on the RNDIS.

After the first electronic device is virtualized into the USB network adapter, the IP addresses are first distributed to the USB module based on the DHCP function, and then the USB module allocates the IP addresses to the first electronic device and the second electronic device respectively. Therefore, the mobile device and the second electronic device may communicate with each other at an IP layer based on the allocated IP addresses by using the USB module.

In a possible implementation of the first aspect, the first electronic device stops transmitting the data to the mobile communications module of the first electronic device by setting a forwarding rule. Specifically, for example, the data may be stopped from being transmitted by port mapping set on a router, and then by adding a service port and selecting IP addresses.

In a possible implementation of the first aspect, the method further includes: The first electronic device displays an option for enabling the first connection mode; the first electronic device receives an operation on the option; and the first electronic device enables the first connection mode in response to the received operation on the option. In other words, for example, after detecting that the first electronic device is connected to the second electronic device that is externally connected by using the USB module, the first electronic device actively sends a request for enabling the first connection mode. For example, a USB P2P connection interface is popped up to start, and the user may enable the USB P2P mode by tapping a confirmation key.

In a possible implementation of the first aspect, the first electronic device enables the first connection mode based on a received request from at least one application running on the first electronic device. That is, in addition to the foregoing enabling manner, a request from one or more applications running on the first electronic device may also be used for enabling. For example, when the application needs to run in the multi-screen collaboration, when the application is started, a request for enabling a USB P2P mode sent by the application is triggered, and the USB P2P mode may be set according to the request.

In a possible implementation of the first aspect, the first electronic device disables the first connection mode after the last application is disabled when a plurality of applications request enabling of the first connection mode. That is, when the plurality of applications all need to run in the USB P2P mode, when one of the applications is disabled, the USB P2P mode is not immediately disabled, but the USB P2P mode continues to be enabled, so that another application that is still running continues to be in a normal running state. After the last application requesting enabling of the USB P2P mode is disabled, the first electronic device automatically disables the USB P2P mode.

Further, when the plurality of applications request enabling of the first connection mode, that the first electronic device disables the first connection mode after the last application is disabled includes: recording an identifier of each application that sends the request, and creating a list; and when a process in which a first application is located ends, removing an identifier corresponding to the first application from the list, and disabling, by the first electronic device, the first connection mode until no identifier exists in the list.

That is, for each application that sends the request to enable the USB P2P mode, the identifier of the application is recorded and the list is created, and when a process of one of the applications ends, the identifier of the application is removed from the list, so that an application that is in a process and needs the USB P2P mode can be accurately managed, thereby effectively avoiding unnecessary impact of disabling the USB P2P mode on the running application. In this way, the plurality of applications can be managed simultaneously to enable and disable the USB P2P mode, and different applications are independent of each other and do not need to be aware of each other. When the plurality of applications all require enabling of the USB P2P mode, the first electronic device needs to be enabled only once, which does not cause a waste of resources. When the plurality of applications exit processes one by one, the USB P2P mode is not disabled until all of the applications end the process.

Further, in a possible implementation of the first aspect, the method further includes: When the first electronic device receives a request for enabling a second connection mode, the first electronic device enables the data that is received by the USB module and that is from the second electronic device to be transmitted to the mobile communications module of the first electronic device, where the second connection mode shares a mobile network of the first electronic device with the second electronic device.

That is, the second connection mode is actually that the second electronic device shares the mobile network of the first electronic device, that is, the so-called network sharing mode, for example, the USB tethering mode. The first electronic device enables the data that is received by the USB module and that is from the second electronic device to be transmitted to the mobile communications module of the first electronic device, that is, the first electronic device enables a path for sending a received data packet from the USB module of the first electronic device to the mobile communications module of the first electronic device. It can be learned with reference to the foregoing description that, when the path is enabled, even if a request for sharing the mobile network sent by the second electronic device to the first electronic device can be forwarded to the mobile communications module of the first electronic device, for example, a cellular module or a Wi-Fi module. When receiving the request, the mobile communications module performs related configuration of the shared network, so that the second electronic device can share the network of the first electronic device. In other words, when it is detected that an application requests enabling of the USB tethering mode, the path for transmitting the data that is received by using the USB module to the mobile communications module of the first electronic device is enabled, so that the second electronic device is capable of sharing the mobile network of the first electronic device. That is, for an external user, the first electronic device simultaneously provides two connection modes: the USB P2P mode and the USB tethering mode, but for the inside of the first electronic device, the two modes are integrated. The request for enabling the second connection mode may be completed by using a setting module, or may be started by using an application on the first electronic device. For specific details, reference may be made to the foregoing description of the request for enabling the first connection mode, and detailed description thereof is omitted herein.

Further, in a possible implementation of the first aspect, when all applications requesting enabling of the first connection mode are disabled, whether the second connection mode is in an enabled state is further detected, and when it is detected that the second connection mode is in the enabled state, the USB module continues to be used as a virtual network adapter until the second connection mode is disabled. That is, even if all applications requesting the USB P2P mode exit the process, if it is detected that the USB tethering mode is still enabled by an application, the USB module as the virtual network adapter is not disabled, that is, the USB tethering mode is kept running until the USB tethering mode is disabled.

In a possible implementation of the first aspect, the first electronic device switches between the first connection mode and the second connection mode based on a request of a running application. Because the USB P2P state and the USB tethering state are coupled and conflict with each other, to resolve the switching between the two states, switching may be performed between the USB P2P state and the USB tethering state based on the request of the running application, thereby avoiding a conflict between the USB P2P state and the USB tethering state, so that collaboration, switching, and the like can be implemented between the USB P2P state and the USB tethering state.

According to a second aspect, this application provides an electronic device, including a touchscreen, a memory, one or more processors, and a plurality of applications, where the electronic device further includes one or more programs for performing a method for connection between devices, the one or more programs for performing the method for connection between devices are stored in the memory, and when the one or more processors execute the one or more programs for performing the method for connection between devices, the electronic device is enabled to implement the method according to any one of the possible implementations of the first aspect.

According to a third aspect, this application further provides a computer-readable storage medium, including computer instructions. When the computer instructions are run on an electronic device, the processor is enabled to perform the method for connection between devices according to any one of the possible implementations of the first aspect.

According to a fourth aspect, this application further provides an electronic device, where the electronic device includes a USB module, a mobile communications module, and a connection module. The connection module is configured to perform IP layer connection between the electronic device and another electronic device, the connection module includes a connectivity manager, and the connectivity manager is configured to: enable a first connection mode, allocate IP addresses to the electronic device and the another electronic device respectively, and enable the electronic device to stop transmitting data received by using the USB module to the mobile communications module.

In other words, in this application, the first connection mode is enabled by setting the connection module at an application framework layer of the electronic device. Specifically, the connection module includes the connectivity manager, and the connectivity manager performs connection setting in the first connection mode. That is, the connectivity manager enables the USB P2P mode, allocates the IP addresses, and enables the electronic device to stop transmitting the data received by using the USB module to the mobile communications module.

In a possible implementation of the fourth aspect, the electronic device allocates, by using the USB module, the IP addresses to the electronic device and the another electronic device based on a DHCP function.

In a possible implementation of the fourth aspect, the electronic device further includes a USB management module and a network management module. The connectivity manager is further configured to send, to the USB management module, a request for setting the USB module to an RNDIS mode, the USB management module is configured to receive the request, and set the USB module to the RNDIS mode based on the request, to virtualize the electronic device into a USB network adapter. The connectivity manager is further configured to allocate IP addresses to the USB module based on the DHCP function and send the IP addresses to the network management module, and the network management module allocates the IP addresses to the electronic device and the another electronic device connected to the electronic device respectively. In other words, the connectivity manager is connected to the USB management module and the network management module, and the connectivity manager enables the USB P2P mode according to an instruction tor enabling the USB P2P mode. Then the connectivity manager indicates the USB management module to set the USB module to the RNDIS mode, and the connectivity manager allocates the IP addresses to the USB module and allocates the IP address to the electronic device and the another electronic device connected to the electronic device by using the network management module. In this way, the USB P2P mode is successfully enabled.

In a possible implementation of the fourth aspect, the connectivity manager stops transmitting the data received by using the USB module to the mobile communications module of the electronic device by setting a forwarding rule.

In a possible implementation of the fourth aspect, the connection module further includes an external listening manager, where the external listening manager is configured to: when it is detected that another electronic device is connected to the electronic device by using the USB module, enable a display of the electronic device to display an option for enabling the first connection mode, and the connectivity manager enables the first connection mode based on a received operation on the option.

In other words, the external listening module is configured to notify a corresponding module when a state of the USB changes, for example, when it is detected that another electronic device is connected to the electronic device by using the USB module, send a request for enabling the USB P2P mode to the connectivity manager. In addition, the external monitoring module may be further configured to manage, for example, an external user, including setting of a setting module, management of interface invoking of another application, and the like.

In a possible implementation of the fourth aspect, the connectivity manager is configured to enable the first connection mode based on a received request from at least one application running on the electronic device. That is, in addition to prompting the user to enable the USB P2P mode after it is detected that the state of the USB changes, the enabling of the USB P2P mode may also be triggered by at least one application running on the electronic device.

In a possible implementation of the fourth aspect, the connectivity manager is further configured to disable the first connection mode after detecting that the last application is disabled when a plurality of applications request enabling of the first connection mode. In this way, the plurality of applications can be managed simultaneously to enable and disable the USB P2P mode. Different applications are independent of each other and do not need to be aware of each other. When the plurality of applications require enabling of the USB P2P mode in sequence, the USB P2P mode needs to be enabled only once, which does not cause a waste of resources. In addition, when the plurality of applications exit processes one by one and require disabling of the USB P2P mode, the USB P2P mode is not disabled before it is confirmed that all applications are ended, thereby avoiding adverse impact on a running application.

In a possible implementation of the fourth aspect, the connection module is further configured to enable a second connection mode between the electronic device and another electronic device, where the second connection mode shares a mobile network of the electronic device with the another electronic device. The connectivity manager is further configured to: when receiving a request for enabling the second connection mode from the connection module, enable the electronic device to transmit the data received by using the USB module to the mobile communications module of the electronic device, to enable the second connection mode.

That is, the connection module may be further configured to enable mobile network sharing (that is, a USB tethering mode) between the electronic device and the another electronic device, and when detecting that an application requests enabling of the USB tethering mode, the connectivity manager enables a path for transmitting the data that is received by using the USB module from the another electronic device to the mobile communications module of the electronic device, so that the another electronic device can share the mobile network of the electronic device. That is, for the external user, the electronic device simultaneously provides two connection modes: the USB P2P mode and the USB tethering mode. However, for the inside of the electronic device, the two modes are integrated. That is, the first connection mode and the second connection mode are simultaneously activated inside the electronic device, and when the first connection mode is set, the path that is disabled by the connection module is enabled again by the connection module.

Further, the electronic device further includes a state machine manager, where the state machine manager is configured to enable the electronic device to switch between the first connection mode and the second connection mode. In other words, the state machine manager is used to manage conflict processing and switching between the USB P2P state and the USB tethering state. In addition, the state machine manager may be used for the management of collaboration between states, state query, and the like.

According to a fifth aspect, this application further provides a computer program product. When the computer program product runs on an electronic device, the electronic device is enabled to perform the method for connection between devices according to any one of the possible implementations of the first aspect.

DESCRIPTION OF EMBODIMENTS

The following clearly and completely describes the technical solutions in embodiments of this application with reference to the accompanying drawings in the embodiments of this application.

The following first further describes the embodiments of this application in detail with reference to the accompanying drawings.

In the following description, an example in which a mobile phone 1 is used as a first electronic device and a notebook computer 2 is used as a second electronic device is used. Certainly, the first electronic device is not limited thereto, and may be, for example, a tablet computer. Similarly, the second electronic device is not limited to a notebook computer, and may be, for example, a tablet computer, a smart television, or a large-screen television.

Figure 1:
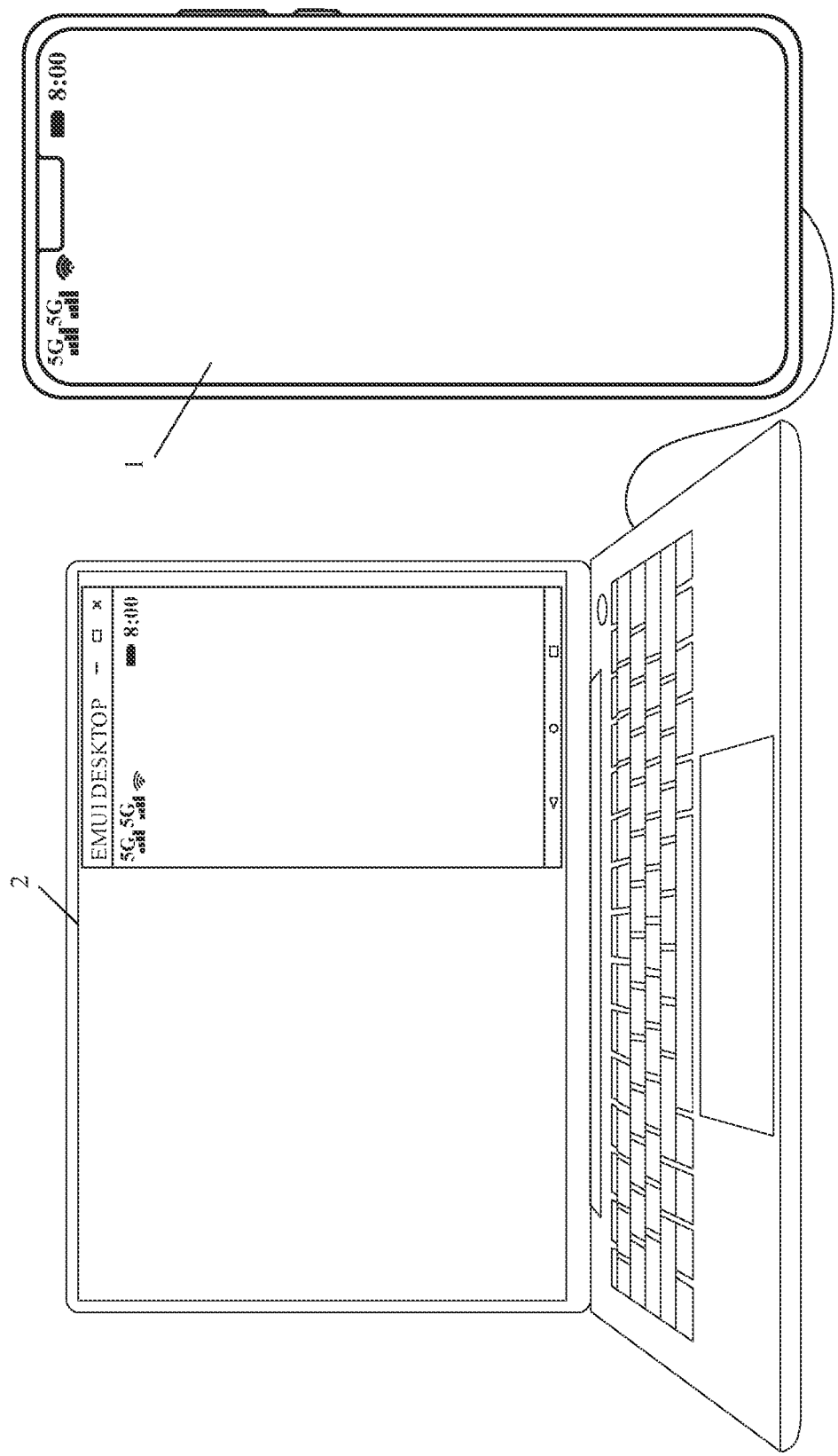
FIG. 1 is a diagram of an application scenario of a method for connection between devices according to an embodiment of this application.

FIG. 1 is a diagram of an example application scenario of a method for connection between devices according to an embodiment of this application.

FIG. 1 shows a scenario of collaborative work between the mobile phone 1 and the notebook computer 2. Multi-screen collaboration allows a user to directly open and edit files in the mobile phone on the computer. The edited files are still saved to the original path on the mobile phone. In addition, reminder information of the mobile phone 1 may be directly displayed on a screen of the notebook computer 2. In addition, the user may further invoke hardware such as a camera, a microphone, and a speaker of the notebook computer 2, to answer a call or a video call of the mobile phone 1, for example, WeChat™, QQ™, TencentMeeting™, WeCom™, and Huawei WeLink™.

A method for implementing multi-screen collaboration between devices includes the following solutions.

Solution 1: Wireless connection. For example, a tablet computer establishes multi-screen collaboration with a Huawei mobile phone (or an Honor mobile phone), and the tablet computer may search for a connection by using Bluetooth or perform a connection by scanning a QR code. For example, the searching for a connection by using Bluetooth includes: Swipe down from a status bar at the top of a mobile phone screen to display a notification panel, and tap a Bluetooth icon to enable Bluetooth; similarly, swipe down from a status bar at the top of a tablet computer screen to display a notification panel, tap multi-screen collaboration, and perform an operation according to a screen prompt; and move the mobile phone close to the tablet computer, and further complete a connection according to a pop-up prompt on the screen of the mobile phone and the tablet computer. However, there is a delay in the wireless connection, and a signal is easily interfered and frame freezing occurs.

Solution 2: A wired connection solution is provided to solve the delay and frame freezing problems in the wireless connection. That is, a USB cable is used to connect the mobile phone at one end and the notebook computer at the other end, thereby implementing multi-screen collaboration. However, if devices communicate with each other only through a USB cable and based on a USB protocol, a USB path is used to transmit data, but IP layers cannot be connected. As a result, a data transmission speed of the devices cannot meet a requirement.

If the IP layers can be connected through the USB cable, the data transmission speed can be greatly increased. For this, currently, a solution of implementing IP protocol-based communication between devices by using a USB network sharing function (that is, a USB tethering function) is disclosed. For example, a mobile phone may share a mobile data network of the mobile phone with another electronic device such as a notebook computer by using a USB. The USB tethering function allows a notebook computer to connect and access a mobile data network of a mobile phone through a universal serial bus (Universal Serial Bus, USB) port. Specifically, when the notebook computer wants to use the mobile network of the mobile phone, it can be implemented through software bridging. In this process, a cellular processor in the mobile phone downloads a data packet from the mobile network, and transmits the data packet to an application processor. The application processor of the mobile phone does not directly process the data packet, but sends the data packet to the notebook computer through USB bridging, and the notebook computer processes the data packet. To implement the mobile network sharing by the computer, after the computer is connected to the mobile phone by using the USB, the notebook computer bridges a request for network sharing of the computer to the mobile phone by using the USB, and the mobile phone sends the request to the cellular processor of the mobile phone. After receiving the request, the cellular processor performs corresponding configuration according to an interface function. In this way, through the software bridging, the computer can use a mobile Internet function of the mobile phone.

That is, the USB tethering technology is to use a USB to share a network. In this mode, when the mobile phone is connected to the computer through a USB cable, the mobile phone is considered as a USB network adapter, so that the computer accesses the Internet by using the USB of the mobile phone. In other words, the computer shares the network of the mobile phone by using the USB of the mobile phone. Currently, most Android mobile phone systems provide this function. This technology allows the IP layers to be connected, greatly increasing the data transmission speed. However, there is a risk that user data of the computer is uncontrollable and network data of the mobile phone is squatted.

In view of the disadvantages of the foregoing two solutions, this application proposes a new connection mode (a first connection mode, or a USB P2P mode for short below). When the mobile phone 1 is connected to the notebook computer 2 through a USB cable, the USB device, or the mobile phone 1, is virtualized into a network adapter, to connect an IP layer of the mobile phone 1 to an IP layer of the notebook computer 2. In addition, to prevent the notebook computer 2 from squatting network data of the mobile phone 1, a path for transmitting received data packet from the notebook computer 2 by using the USB module of the mobile phone 1 to the mobile communications module of the mobile phone 1 is disabled, that is, the notebook computer 2 cannot share the mobile network of the mobile phone 1. Therefore, advantages of the foregoing two solutions can be utilized, and disadvantages of the foregoing two solutions can be avoided.

Figure 2:
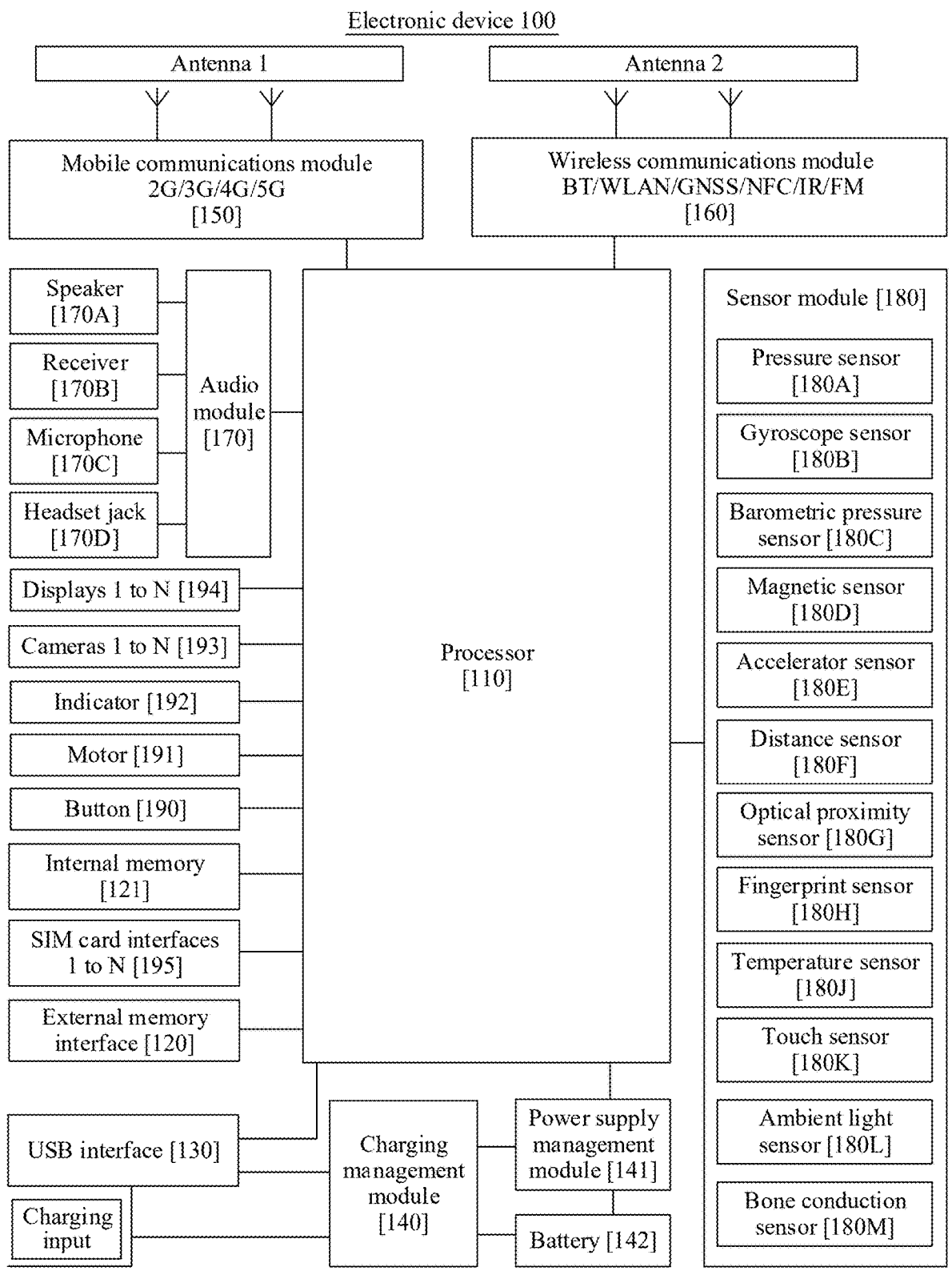
FIG. 2 is a schematic diagram of a structure of an electronic device according to an embodiment of this application.

FIG. 2 is a schematic diagram of a structure of an electronic device 100 including a mobile phone according to some embodiments of this application. For example, the electronic device may include a terminal device such as a mobile phone or a tablet computer mentioned in the foregoing application scenario of this application.

The electronic device 100 may include a processor 110, an external memory interface 120, an internal memory 121, a universal serial bus (universal serial bus, USB) port 130, a charging management module 140, a power supply management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an accelerator sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural processing unit (neural-network processing unit, NPU), and/or the like. Different processing units may be independent components, or may be integrated into one or more processors.

The processor 110 may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data that have been used or cyclically used by the processor 110. If the processor 110 needs to use the instructions or the data again, the processor may directly invoke the instructions or the data from the memory. This avoids repeated access, reduces waiting time of the processor 110, and improves system efficiency. For example, as the processor 110 of the mobile phone that adopts a USB P2P mode, after receiving an instruction for enabling the USB P2P mode, the processor 110 first virtualizes the mobile phone into a USB network adapter, allocates IP addresses by using a USB module, and enables the mobile phone to stop transmitting data received by using the USB module to a mobile communications module of the mobile phone. In this way, IP layer-based data transmission can be implemented without mobile network sharing.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, or a subscriber identity module (subscriber identity module, SIM) interface.

The I2C interface is a two-wire synchronization serial bus, and includes a serial data line (serial data line, SDA) and a serial clock line (serial clock line, SCL). In some embodiments, the processor 110 may include a plurality of groups of I2C buses. The processor 110 may be coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, to execute program instructions to generate or change display information.

The electronic device 100 may implement a photographing function through the ISP, the camera 193, the video codec, the GPU, the display 194, the application processor, and the like.

The external memory interface 120 may be used to connect to an external storage card, for example, a micro SD card, to extend storage capabilities of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area.

The program storage area may store an operating system, an application program required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs instructions stored in the internal memory 121 and/or instructions stored in the memory disposed in the processor, to perform various function, applications running and data processing of the electronic device 100.

According to some embodiments of this application, the internal memory 121 stores instructions (in other words, computer-readable code), and when reading the instructions stored in the internal memory 121, the processor 110 performs a method for connection between devices according to this application. For details, reference may be made to a method for connection between devices in the following embodiment.

The USB port 130 is a connector that complies with a USB standard specification, and may be configured to connect the electronic device 100 and a peripheral device, and may be specifically a standard USB port (for example, a Type C port), a mini USB port, a micro USB port, or the like. The USB port 130 may be configured to connect to a charger to charge the electronic device 100, or may be configured to transmit data between the electronic device 100 and a peripheral device. Alternatively, the USB port may be configured to connect to a headset for playing audio through the headset. The port may be further configured to connect to another electronic device such as an AR device. In some implementation solutions, the processor 110 may support a universal serial bus (Universal Serial Bus), and a standard specification of the universal serial bus may be USB 1.x, USB 2.0, USB 3.x, or USB 4.

A software system of the electronic device 100 may use a layered architecture, an event-driven architecture, a micro-kernel architecture, a micro service architecture, or a cloud architecture. In embodiments of this application, an Android system with a layered architecture is used as an example to describe a software structure of the electronic device 100.

Figure 3:
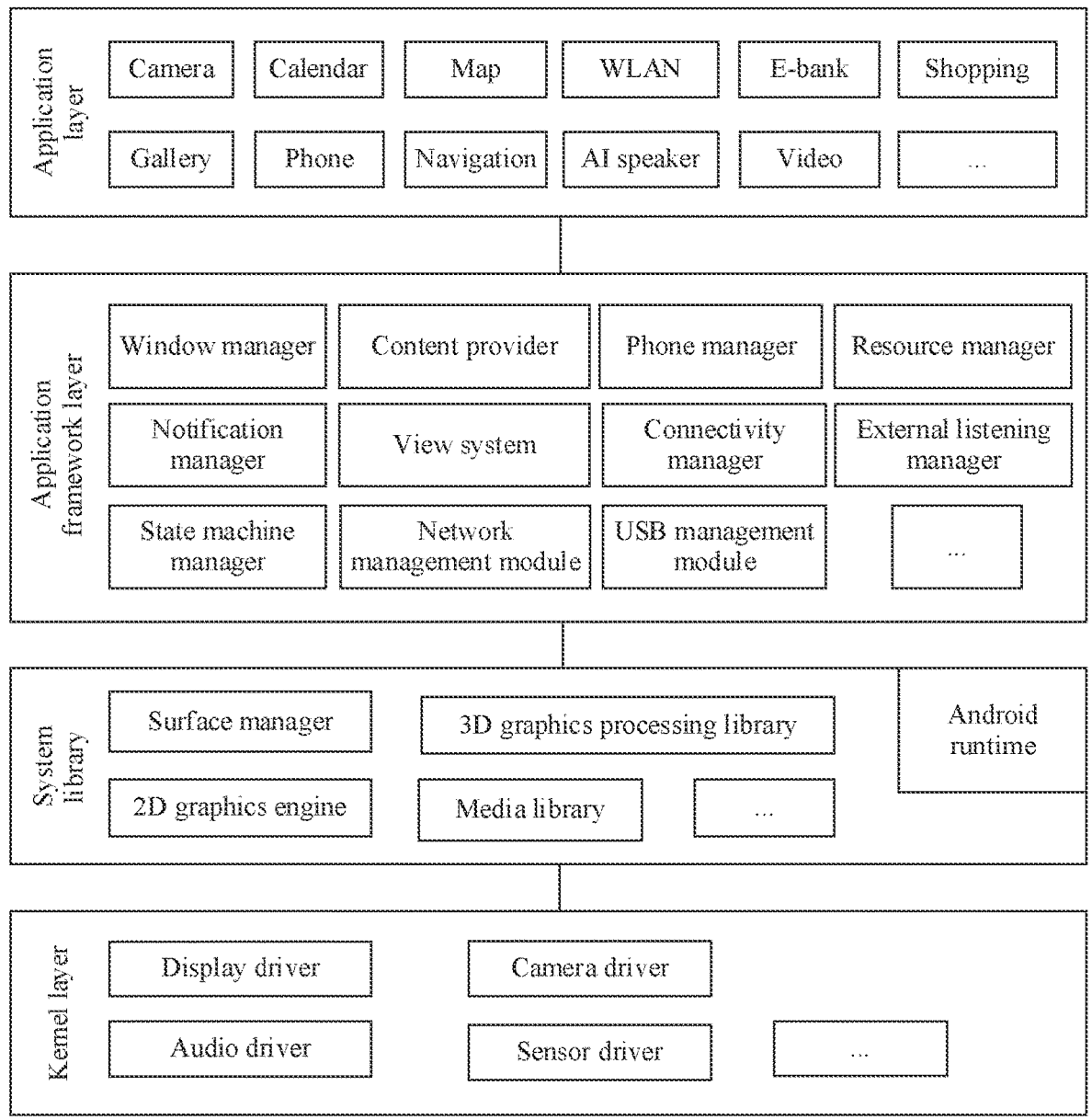
FIG. 3 is a block diagram of a software structure of an electronic device according to an embodiment of this application.

FIG. 3 is a block diagram of a software structure of an electronic device 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages. As shown in FIG. 3, the application package may include applications such as Camera, Gallery, Calendar, Phone, Map, Navigation, WLAN, Bluetooth, and Video. For example, applications such as HoloScreens™, iQIYI™, WeChat™, E-mail, and Gallery may be opened by using multi-screen collaboration, to perform more convenient processing by using an application ecosystem of a computer.

The application framework layer provides an application programming interface (application programming interface, API) and a programming framework for an application at the application layer. The application framework layer includes some predefined functions. As shown in FIG. 3, the application framework layer may include a window manager, a content provider, a phone manager, a resource manager, a notification manager, a view system, a connectivity manager, an external listening manager, a state machine manager, a network management module, a USB management module, and the like.

The connectivity manager, the external listening manager, and the state machine manager form a connection module to manage a connection mode between devices. The connectivity manager is connected to the network management module, the USB management module, the external listening manager, and the state machine manager respectively. The connection module is configured to perform IP layer connection between the mobile phone and the notebook computer.

In a possible implementation of this application, the connectivity manager is configured to enable a USB P2P mode (as an example of the first connection mode), and allocate, by using the USB module, IP addresses to the electronic device and another electronic device (that is, the second electronic device) connected to the electronic device based on a DHCP function. That is, the connectivity manager enables, by using the USB management module according to the request for enabling the USB P2P mode, the USB mode, for example, the RNDIS mode, and allocates the IP addresses to the mobile phone and the notebook computer by using the network management module. In addition, in some other possible implementations of this application, the connectivity manager is further configured to enable a USB tethering mode (as an example of a second connection mode), so that the another electronic device shares a mobile network of the electronic device.

The external listening manager is configured to manage an external user, including setting of a setting module, or management of interface invoking of another application, and notify a corresponding module when a USB state changes. Specifically, for example, when the user enables the USB P2P mode by using the setting module, the external listening manager feeds back information to the connectivity manager, to perform corresponding setting to implement normal running of the USB P2P mode; or when it is detected that the USB port is connected to an external device such as a notebook computer through a connection cable, an option of USB connection is popped up, so that the connectivity manager performs a corresponding operation after the user selects the option.

The state machine manager is mainly configured to perform switching between the first connection mode and the second connection mode and manage state integration.

Specifically, reference may be made to the following detailed descriptions of Embodiment 1 to Embodiment 3 with reference to FIG. 6 to FIG. 9.

The Android runtime includes a kernel library and a virtual machine. The Android runtime is responsible for scheduling and management of the Android system.

The application layer and the application framework layer run on a virtual machine. The virtual machine executes java files at the application layer and the application framework layer as binary files. The virtual machine is configured to implement functions such as object lifecycle management, stack management, thread management, security and exception management, and junk files collection.

The kernel layer is a layer between hardware and software. The kernel layer includes at least a display driver, a camera driver, an audio driver, and a sensor driver.

The following describes an example of a working process of software and hardware of the electronic device 100 with reference to a scenario of shopping in a shopping APP. When the touch sensor 180K receives a touch operation, that is, an operation of touching a shopping APP icon, a corresponding hardware interrupt is sent to the kernel layer. The kernel layer processes the touch operation into an original input event (including information such as touch coordinates and a time stamp of the touch operation), and the original input event is stored at the kernel layer. The application framework layer obtains the original input event from the kernel layer, and identifies a control corresponding to the input event. For example, the touch operation is a touch and tap operation, and a control corresponding to the tap operation is a control of the shopping APP icon. The shopping APP application invokes an interface of the application framework layer to start the shopping application, to enable a display driver by invoking the kernel layer, and obtain corresponding store information from a server of the shopping APP by using the mobile communications module 150 or the wireless communications module 160.

Figure 4:
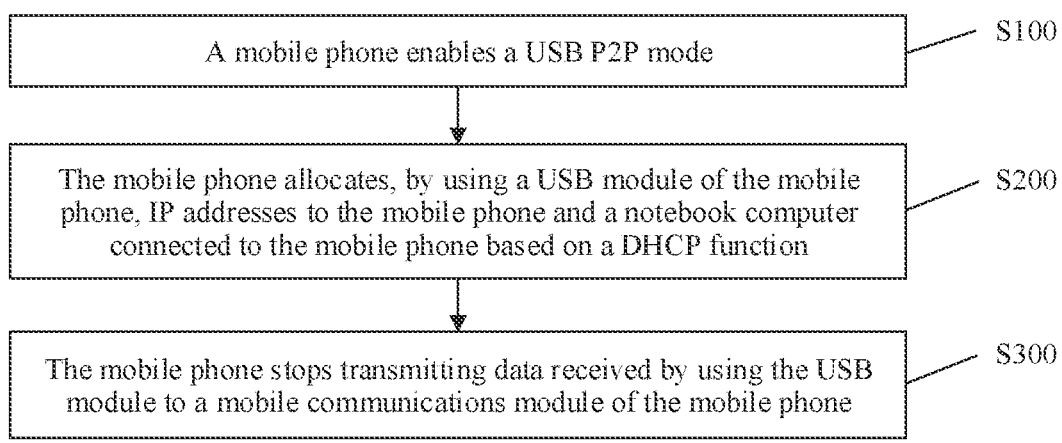
FIG. 4 is a schematic flowchart of a method for connection between devices according to an embodiment of this application.
Figure 5A:
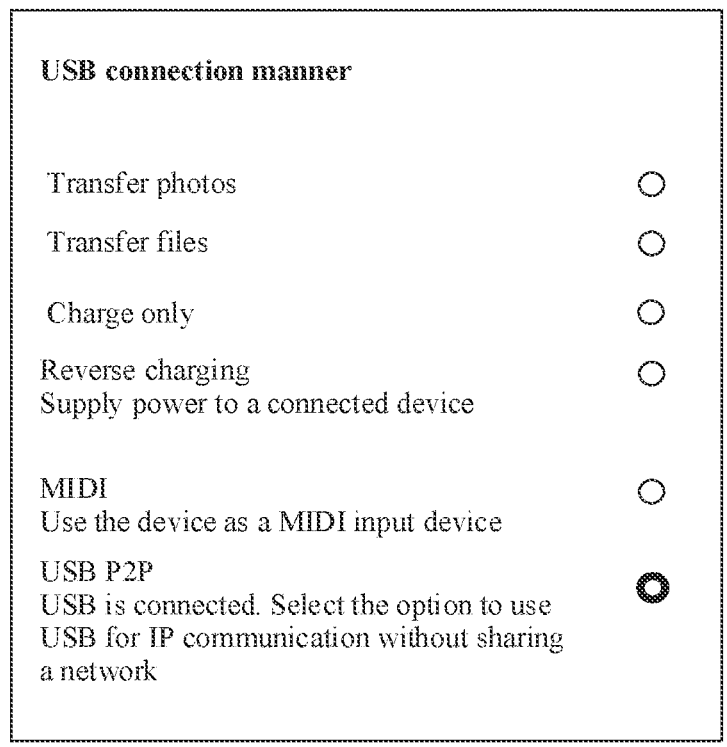
FIG. 5(a) shows a selection interface of a mobile phone in a USB P2P mode.
Figure 5B:
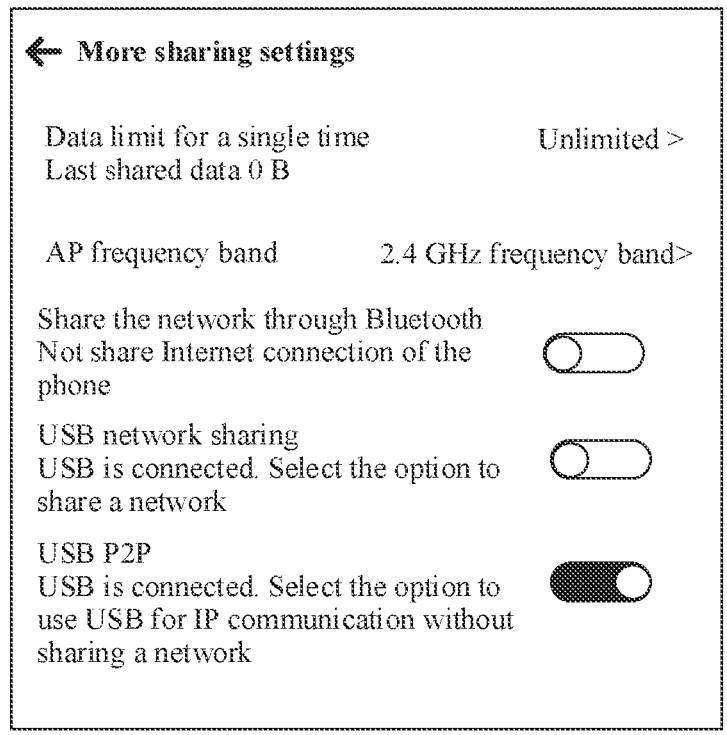
FIG. 5(b) shows another selection interface of a mobile phone in a USB P2P mode.
Figure 6:
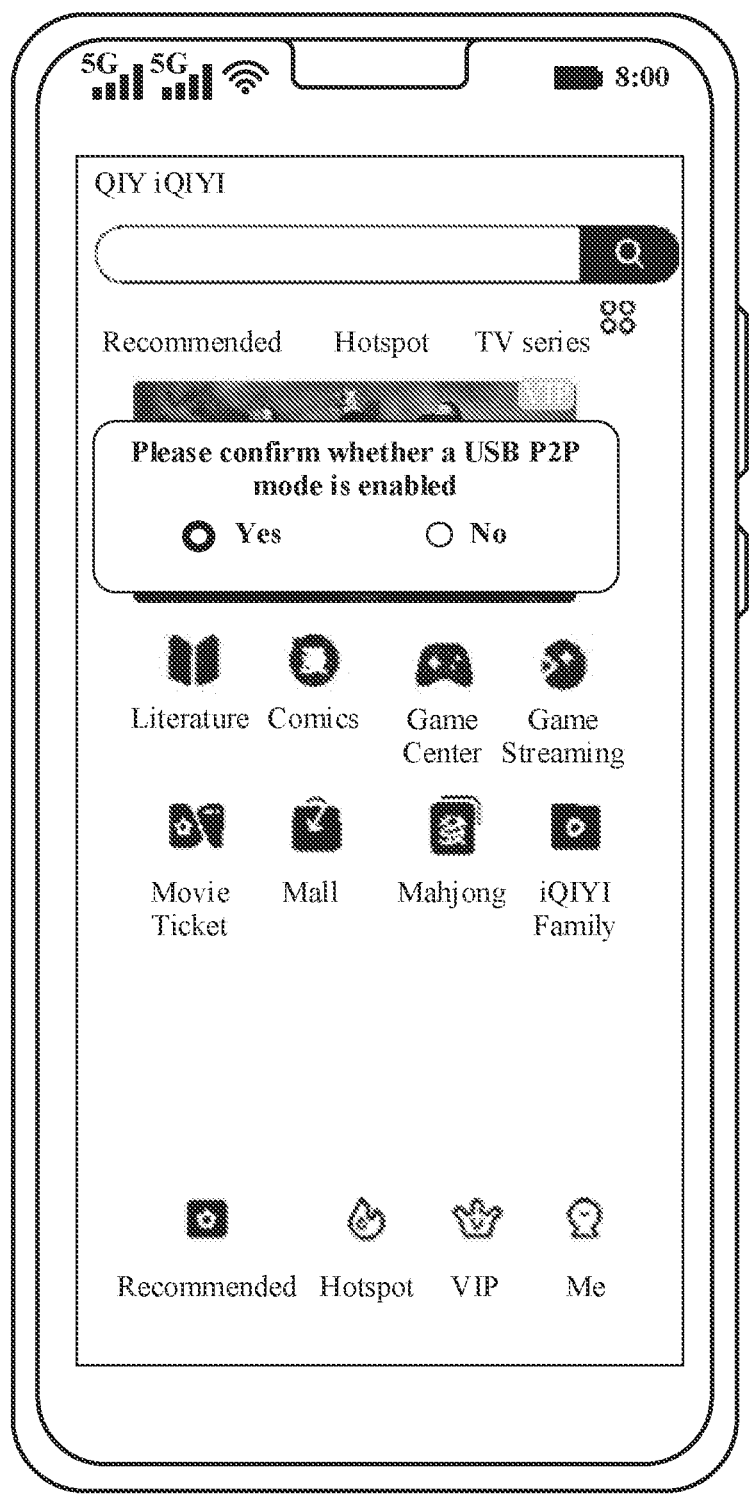
FIG. 6 is a schematic diagram of triggering and enabling a USB P2P mode by an application according to an embodiment of this application.

With reference to FIG. 4 to FIG. 6, the following describes a method for connection between devices according to an embodiment of this application.

The following uses a method for connection between a mobile phone and a notebook computer as an example for description. That is, the mobile phone is an instance of the first electronic device, and the notebook computer is an instance of the second electronic device.

As shown in FIG. 4, the method for connection between devices according to an embodiment of this application includes the following steps.

Step S100: The mobile phone enables a USB P2P mode.

As described above, the USB P2P mode is used to implement IP layer connection between the mobile phone and the notebook computer.

Specifically, for example, when the mobile phone detects that the notebook computer is connected to the mobile phone by using a USB module, the mobile phone may send a request for enabling the USB P2P mode. Based on the request, the USB P2P mode may be enabled by confirmation of a user.

For example, when the mobile phone detects that a USB port of the mobile phone is connected to an external device such as the notebook computer through a USB cable, a selection box shown in FIG. 5(*a*) or FIG. 5(*b*) may pop up for the user to select. FIG. 5(*a*) shows options set in USB connection. FIG. 5(*b*) shows an option added at USB hotspot sharing. The two settings do not have any essential difference. A difference lies in positions of the two settings. When the user selects the USB P2P mode, the mobile phone enables the USB P2P mode to perform corresponding settings, for example, the following mode setting of the USB module, IP address allocation, and a setting of a data packet forwarding rule. The USB port may be a standard USB connector (for example, a Type A connector, a Type B connector, or a Type C connector), a mini USB port, a micro USB port, or the like.

Certainly, the selection box may also be hidden, and the mobile phone is directly configured to set to the option by default, that is, when the mobile phone is connected to the external device through the USB cable, the USB P2P mode is selected by default, and the USB P2P mode is directly enabled. If the mobile phone wants to disable the mode and enable another mode such as a charging mode, the USB setting option may be invoked for a corresponding setting.

In addition, in one of enabling manners, the mobile phone may alternatively enable the USB P2P mode based on a request sent by an application running on the mobile phone. For example, as shown in FIG. 6, the mobile phone starts the iQIYI™, a service box of the iQIYI™ pops up, and a reminder box prompting the user to enable the USB P2P mode appears in the service box.

Step S200: The mobile phone allocates, by using the USB module of the mobile phone, IP addresses to the mobile phone and the notebook computer connected to the mobile phone based on a DHCP function.

That is, after the mobile phone is virtualized into a USB network adapter, the IP addresses are allocated, based on the DHCP function, to the mobile phone and the notebook computer connected to the mobile phone, to perform IP layer connection between the mobile phone and the notebook computer.

Specifically, a manner of virtualizing the device into the USB network adapter, for example, setting the USB module to an RNDIS mode is to enable the mobile phone to work like the USB network adapter when TCP/IP is run on the mobile phone by using the USB module. Currently, a mobile phone, a tablet computer, a smartwatch, and a computer can all be virtualized into a USB network adapter in the RNDIS mode.

Then, the IP addresses are allocated, by using the USB module, to the mobile phone and the notebook computer connected to the mobile phone through the USB cable based on the DHCP function.

It should be noted that the IP addresses are not limited to be allocated based on the DHCP mode, and any solution that can perform IP address allocation is applicable to this application.

Step S300: The mobile phone stops transmitting data received by using the USB module to a mobile communications module of the mobile phone.

That is, the USB module of the mobile phone receives the data from the notebook computer, and stops transmitting the data to the mobile communications module of the mobile phone.

Specifically, if the notebook computer is to share a mobile network of the mobile phone, the notebook computer sends a request for mobile network sharing to the mobile phone. The request is first received by the USB module of the mobile phone through the USB port. The mobile phone needs to send the data (that is, the request) to the mobile communications module of the mobile phone, and receive a corresponding response made by the mobile communications module, so that the mobile network sharing can be implemented. According to the technical solution in this embodiment of this application, a path for transmitting the data received by using the USB module to the mobile communications module of the mobile phone is disconnected, so that mobile network sharing in the USB P2P mode can be avoided.

For example, the mobile phone may stop transmitting the data received by using the USB module to the mobile communications module of the mobile phone by setting a forwarding rule. More specifically, for example, transmitting the data may be stopped by setting port mapping on a router, and then by adding a service port and selecting an IP address.

According to the method for connection between devices according to Embodiment 1, the mobile phone is virtualized into the USB network adapter, and the IP addresses are allocated to the mobile phone and the notebook computer respectively, so that the IP layer connection between the mobile phone and the notebook computer can be implemented, and data transmission at the IP layer can be implemented, to greatly increase the data transmission speed compared with a common USB connection and USB protocol-based communication. In addition, the forwarding rule is set, so that the mobile phone and the notebook computer do not share the mobile network, and the mobile phone and the notebook computer each uses a network to access the Internet, to prevent the notebook computer from squatting data of the mobile phone.

With reference to the accompanying drawings, the following describes in detail a method for connection between devices according to an embodiment of this application.

Embodiment 1

Figure 7:
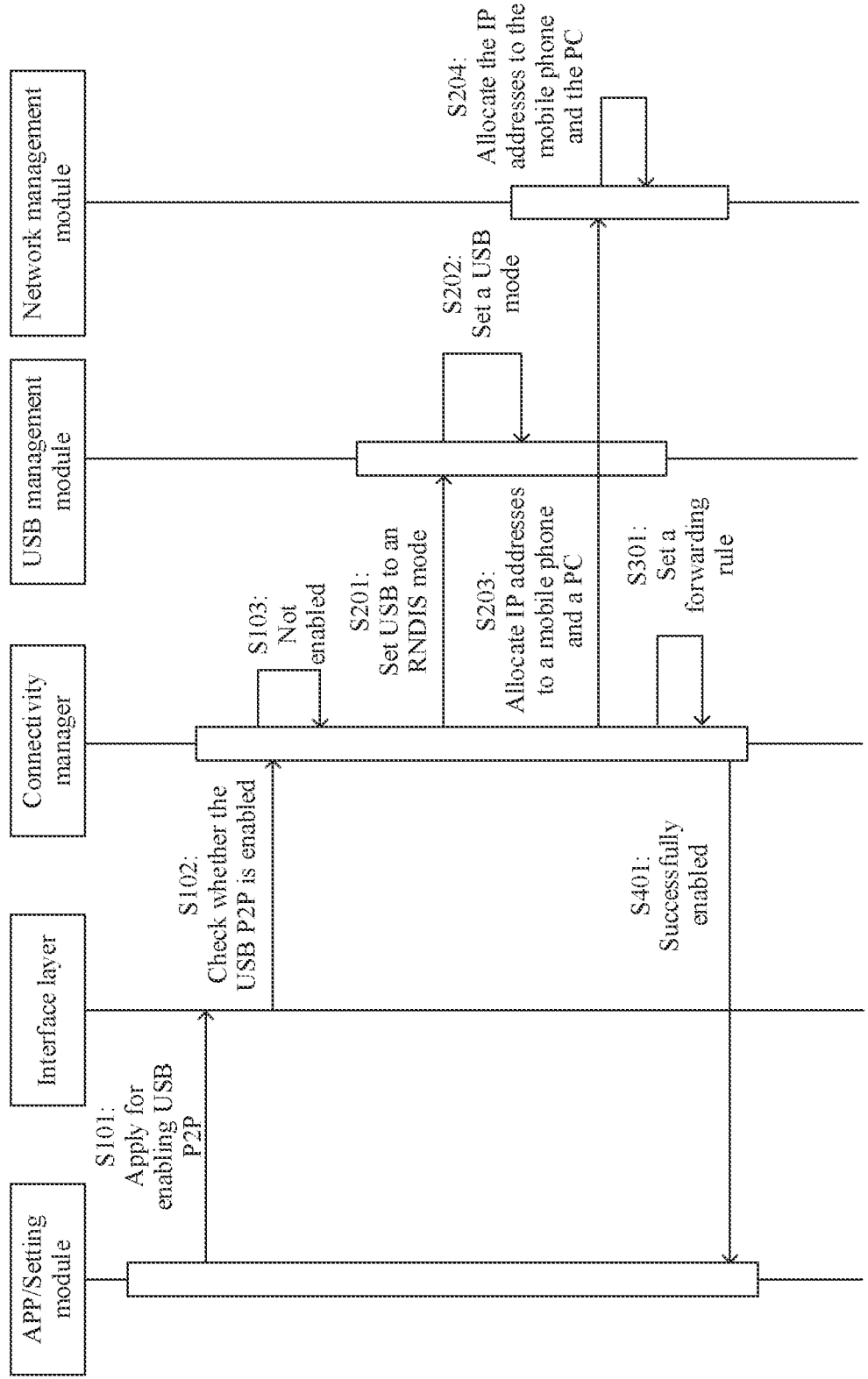
FIG. 7 is a schematic flowchart of a method for connection between devices according to Embodiment 1 of this application.

First, with reference to FIG. 7, a method for connection between devices according to Embodiment 1 of this application is described in detail.

After a mobile phone and a notebook computer are connected through a USB cable, the mobile phone implements connection in a USB P2P mode by performing the following steps.

Step S101: The mobile phone sends a request for enabling a USB P2P mode by using an application, or sends a request for enabling a USB P2P mode by using a selection box of a USB connection mode and a USB P2P option in a sharing setting selection box in a setting module, as shown in FIG. 5(a) and FIG. 5(b).

Step S102: After receiving the request, an interface layer of the mobile phone indicates a connectivity manager to check whether the USB P2P mode is enabled.

Step S103: When the connectivity manager detects that the USB P2P mode is not enabled, the connectivity manager enables the USB P2P mode.

Step S201: The connectivity manager indicates a USB management module to set a USB module to an RNDIS mode.

Step S202: After receiving an indication of the connectivity manager, the USB management module sets the USB module to the RNDIS mode. In this way, the USB module is virtualized into a network adapter.

Step S203: The connectivity manager indicates a network management module to allocate IP addresses.

Step S204: After receiving an indication for allocating the IP addresses, the network management module allocates the IP addresses to the mobile phone and the notebook computer by using DNSmasq software based on a DHCP function.

Step S301: The connectivity manager sets a forwarding rule, to disable a path for transmitting a data packet received by the USB module to a mobile network module.

That is, the notebook computer cannot share a mobile network of the mobile phone.

Step S401: The connectivity manager provides feedback to an APP/a setting module that the USB P2P mode is successfully enabled.

According to the method for connection between devices in Embodiment 1, the USB module is virtualized into the network adapter and the IP addresses are allocated to the mobile phone and the notebook computer respectively, so that IP layer connection between the mobile phone and the notebook computer can be implemented, and data transmission at the IP layer can be implemented, to greatly increase a data transmission speed compared with a common USB connection and USB protocol-based communication. In addition, the forwarding rule is set, so that the mobile phone and the notebook computer do not share the mobile network, and the mobile phone and the notebook computer each uses a network to access the Internet, to prevent the notebook computer from squatting data of the mobile phone.

Embodiment 2

Figure 8:
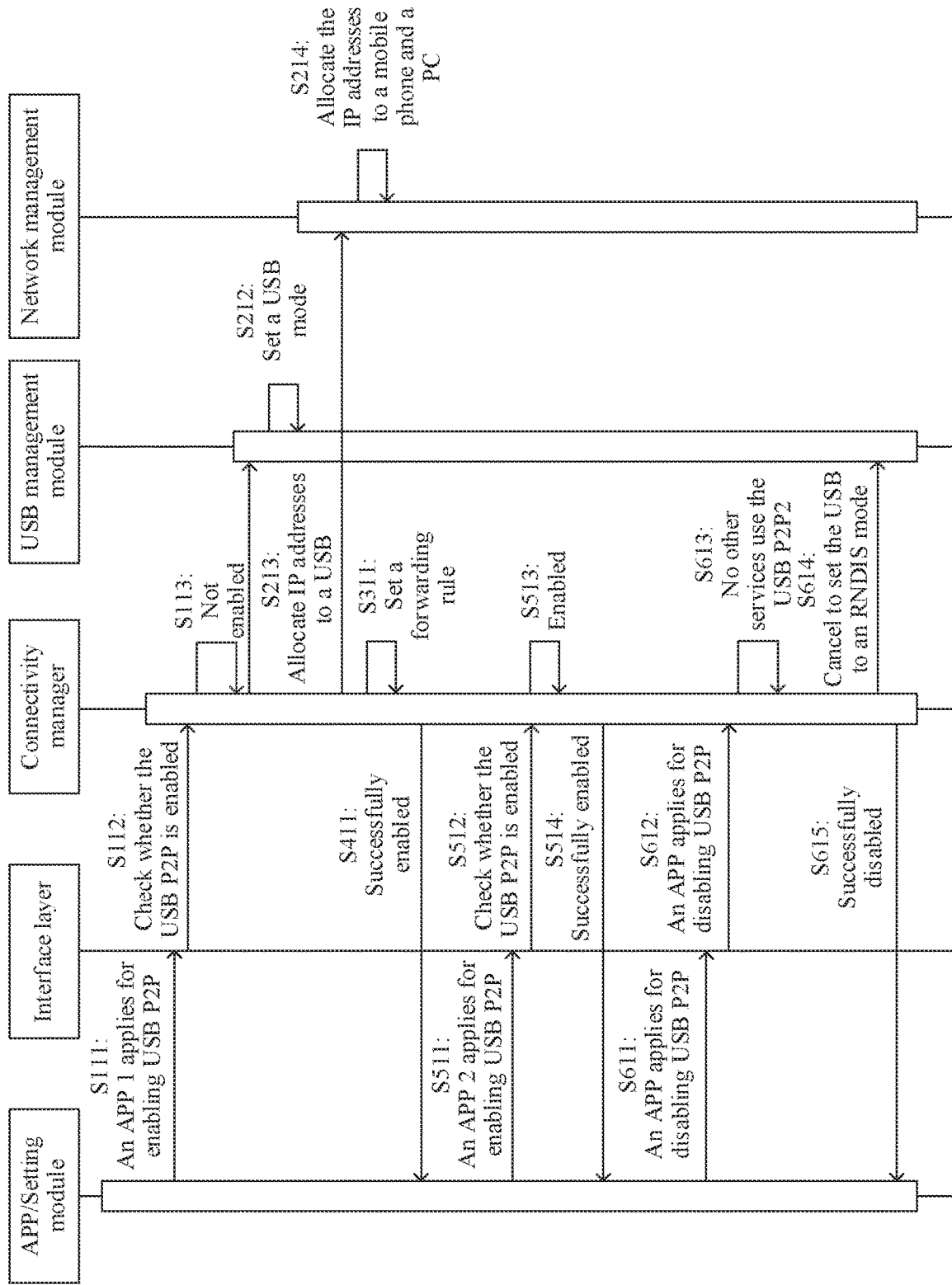
FIG. 8 is a schematic flowchart of a method for connection between devices according to Embodiment 2 of this application.

Next, with reference to FIG. 8, a method for connection between devices according to Embodiment 2 of this application is described in detail.

After a mobile phone and a notebook computer are connected through a USB cable, the mobile phone implements connection in a USB P2P mode by performing the following steps.

Step S111: The mobile phone sends a request for enabling a USB P2P mode through an application 1.

Step S112: After receiving the request, an interface layer of the mobile phone indicates a connectivity manager to check whether the USB P2P mode is enabled.

Step S113: When the connectivity manager detects that the USB P2P mode is not enabled, the connectivity manager enables the USB P2P mode.

Step S211: The connectivity manager indicates a USB management module to set a USB module to an RNDIS mode.

Step S212: After receiving an indication of the connectivity manager, the USB management module sets the USB module to the RNDIS mode. In this way, the USB module is virtualized into a network adapter.

Step S213: The connectivity manager indicates a network management module to allocate IP addresses.

Step S214: After receiving an indication for allocating the IP addresses, the network management module allocates the IP addresses to the mobile phone and the notebook computer by using DNSmasq software based on a DHCP function.

Step S311: The connectivity manager sets a forwarding rule, to disable a path for transmitting a data packet received by the USB module to a mobile network module.

That is, the notebook computer cannot share a mobile network of the mobile phone.

Step S411: The connectivity manager provides feedback to an APP/a setting module that the USB P2P mode is successfully enabled.

Step S111 to step S411 are the same as those in Embodiment 1. Details are not described herein. Different from the Embodiment 1, in this embodiment, the USB P2P mode required by a plurality of applications is further managed. Specifically, in addition to the foregoing steps, the method further includes the following steps.

Step S511: An application 2 running on the mobile phone sends a request for enabling the USB P2P mode.

Step S512: After receiving the request, the interface layer indicates the connectivity manager to check whether the USB P2P mode is enabled.

Step S513: The connectivity manager detects that the USB P2P mode is enabled.

Step S514: The connectivity manager notifies the application 2 that the mode is successfully enabled. In this way, the application 2 can normally use the USB P2P mode to perform multi-screen collaboration.

In other words, in addition to the application 1, a plurality of applications that require multi-screen collaboration may be simultaneously run on the mobile phone. After the USB P2P mode is enabled through a first application (that is, the application 1), when an application (for example, the application 2) then sends a request for enabling the USB P2P mode, the interface layer notifies the connectivity manager to detect whether the USB P2P mode is enabled. After receiving the notification, the connectivity manager performs detection, and after determining that the mode is enabled, notifies the application 2 that the mode is successfully enabled. In this case, the application 2 can normally use the multi-screen collaboration function.

Further, when the plurality of applications request enabling of the USB P2P mode, there is also a problem of an exit mechanism of the USB P2P mode.

Therefore, this embodiment further includes the following step.

Step S611: An application requests disabling of the USB P2P mode. It should be noted that the application may be any one of the plurality of running applications.

Step S612: After receiving the request, the interface layer notifies the connectivity manager to disable the USB P2P mode.

Step S613: The connectivity manager performs detection, and stops disabling when determining that another application is using the USB P2P mode.

Step S614: When it is determined that no other application is using the USB P2P mode, the USB management module is notified to cancel setting the USB RNDIS mode (that is, cancel virtualizing the USB module into the network adapter), and the USB management module performs corresponding setting.

In other words, in a case in which the plurality of applications apply for enabling the USB P2P mode, when each application ends use and exits in sequence, and when the last application exits the USB P2P mode, the USB management module manages the setting of the USB module and disables the USB RNDIS mode. And the mode is enabled again until there is a request for enabling from a next application.

Step S615: The connectivity manager notifies a setting module of the mobile phone that the disabling is completed. In other words, a selection box of the setting module no longer shows that the mode is enabled.

In addition, when the foregoing application requests enabling of the USB P2P mode, the connectivity manager further records an identifier of each request for enabling the USB P2P mode, for example, may use a user ID or any identifier that can identify an invoker. When the plurality of applications request enabling of the USB P2P mode, identifiers of the plurality of applications are recorded to form a list. Afterwards, when an application exits a process (applies for being disabled or abnormally exits), the connectivity manager removes a corresponding identifier from the foregoing list.

Therefore, according to the method for connection between devices according to this embodiment, it can be determined whether any application is using the USB P2P mode, provided that whether an identifier still exists in the list is confirmed, and the USB P2P mode is disabled only when no identifier exists in the list, so that the application using the USB P2P mode can be easily managed, and abnormal interruption and data loss of the application caused by an error exit can be avoided.

Embodiment 3

Figure 9A:
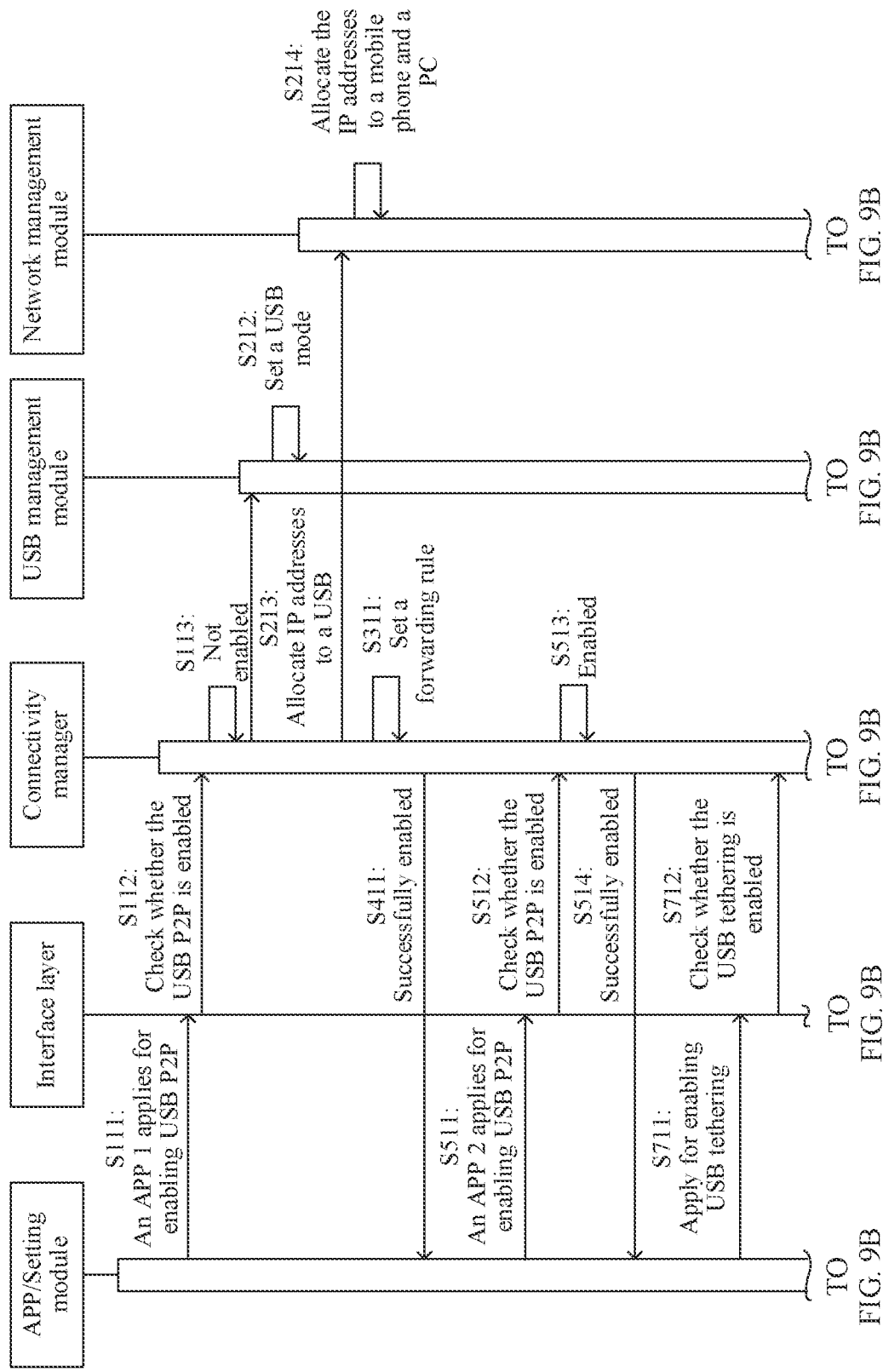
FIG. 9 is a schematic flowchart of a method for connection between devices according to Embodiment 3 of this application.
Figure 9B:
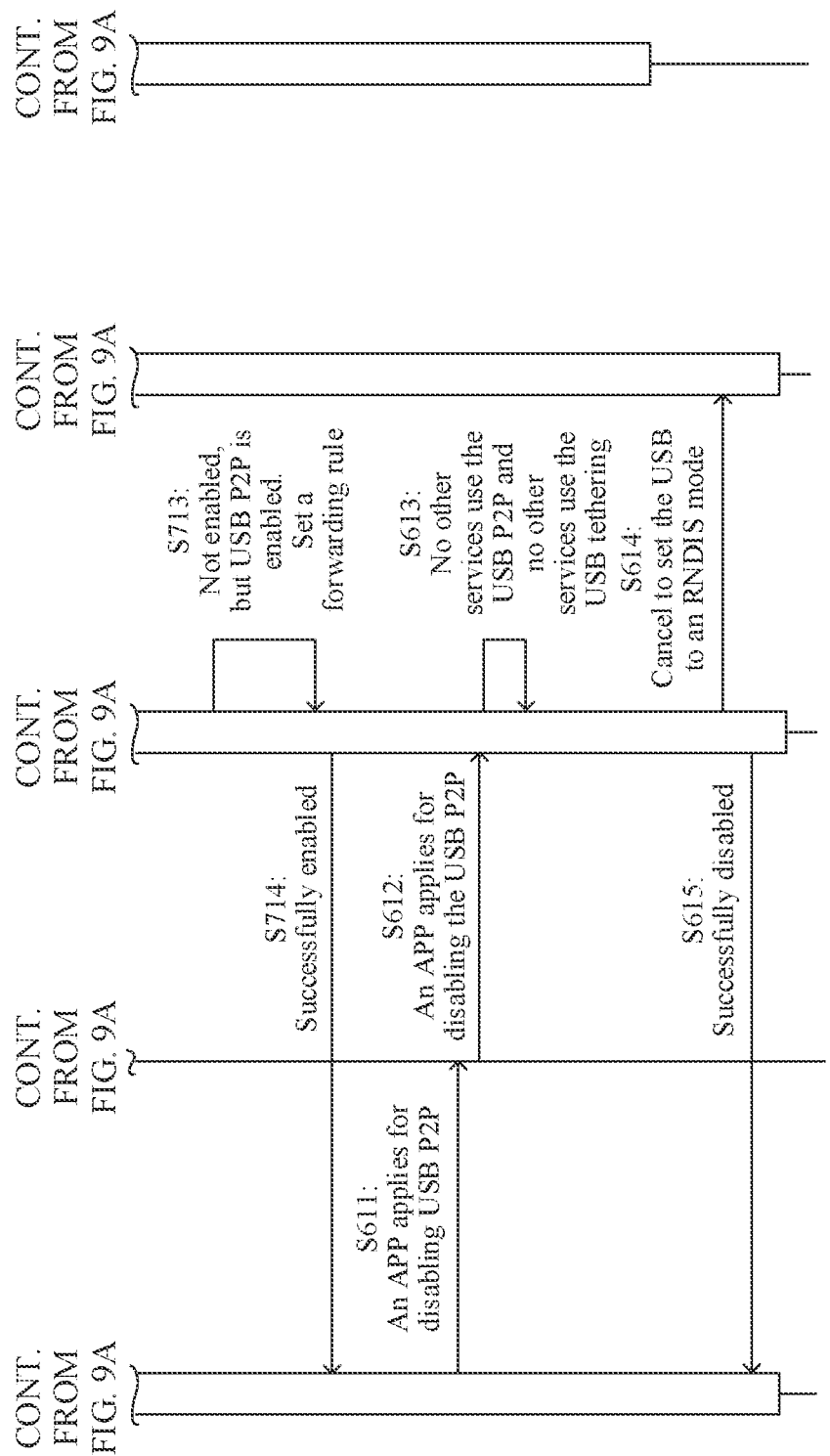

With reference to FIG. 9, the following describes in detail a method for connection between devices according to Embodiment 3.

Steps (that is, step S111 to step S514) of enabling the USB P2P mode by using the application 1 and the application 2 as an example are the same as those in Embodiment 2. In FIG. 9, a same step number is used, and detailed description thereof is omitted.

Different from Embodiment 2, in addition to the plurality of applications requesting enabling of the USB P2P mode, a setting module requests enabling of a USB tethering mode, that is, requests sharing of a mobile network of the mobile phone with the notebook computer. To ensure running of the USB tethering mode, this embodiment further includes the following steps.

Step S711: The setting module applies for enabling the USB tethering mode.

Step S712: An interface layer indicates a connectivity manager to check whether the USB tethering mode is enabled.

Step S713: The connectivity manager performs a check, and when it is detected that the USB tethering mode is not enabled, sets a forwarding rule, so that data received by the USB module from the notebook computer can be transmitted to a mobile communications module of the mobile phone.

Step S714: Send a notification of successful enabling to the setting module.

Certainly, this embodiment provides only an example, that is, a case in which the USB P2P mode is first enabled and then the USB tethering mode is applied to be enabled. In addition, after the USB tethering mode is enabled, some applications apply to enable the USB P2P mode. Similarly, in this case, provided that the connectivity manager detects that the USB tethering mode is already enabled, because IP layer communication can be directly performed in this state, the connectivity manager directly sends a notification of successful enabling to the setting module. It should be noted that, in this case, the connectivity manager does not set the forwarding rule, but retains the forwarding rule in the USB tethering mode, so that the USB tethering mode can continuously run normally. However, an upper-layer user is unaware of the fact that the USB P2P mode and the USB tethering mode are simultaneously enabled.

In addition, when all applications that apply for enabling the USB P2P mode end the process, because the mobile phone simultaneously enables the USB P2P mode and the USB tethering mode, different from Embodiment 2, in step S614, it is further determined whether no other application uses the USB tethering mode, and the USB management module is notified to cancel setting the RNDIS mode only when the application uses neither the USB P2P mode nor the USB tethering mode. That is, when the application exits the USB P2P mode, the USB module does not really exit the mode of the virtual network adapter, so that the USB tethering mode can run formally.

Similarly, when the mobile phone exits the USB tethering mode, the mobile phone does not immediately notifies the USB management module to cancel the setting of the RNDIS mode. When all applications that use the USB tethering mode of the mobile phone end the process, the forwarding rule is first reset by using the connectivity manager, to disable the path for transmitting the data that is received by the USB module and that is from the notebook computer to the mobile communications module of the mobile phone, but keep the USB management module in the RNDIS mode, so that the USB P2P mode continues to run. That is, in this case, although the setting module shows that the USB tethering mode is disabled, a bottom layer of an operating system of the mobile phone actually does not disable the RNDIS mode. The connectivity manager notifies the USB management module to cancel the setting of the RNDIS mode only when the processes of all the applications that use the USB P2P mode also end. That is, in this case, the setting module shows that both the USB P2P mode and the USB tethering mode are disabled, the USB module has exited the virtual network adapter mode, and all IP layer communication paths between the mobile phone and the notebook computer are disconnected. In this case, data transmission can be performed only based on the USB protocol between the mobile phone and the notebook computer.

It can be learned from the foregoing description of Embodiment 3 that states of the USB P2P mode and the USB tethering mode are coupled and conflict with each other. Therefore, to solve the problem of switching between the two states, as shown in FIG. 3, a state machine manager may be set at an application framework layer, and is for conflict processing, collaboration, switching, state query, and the like between the states of the USB P2P state and the USB tethering state.

Figure 10:
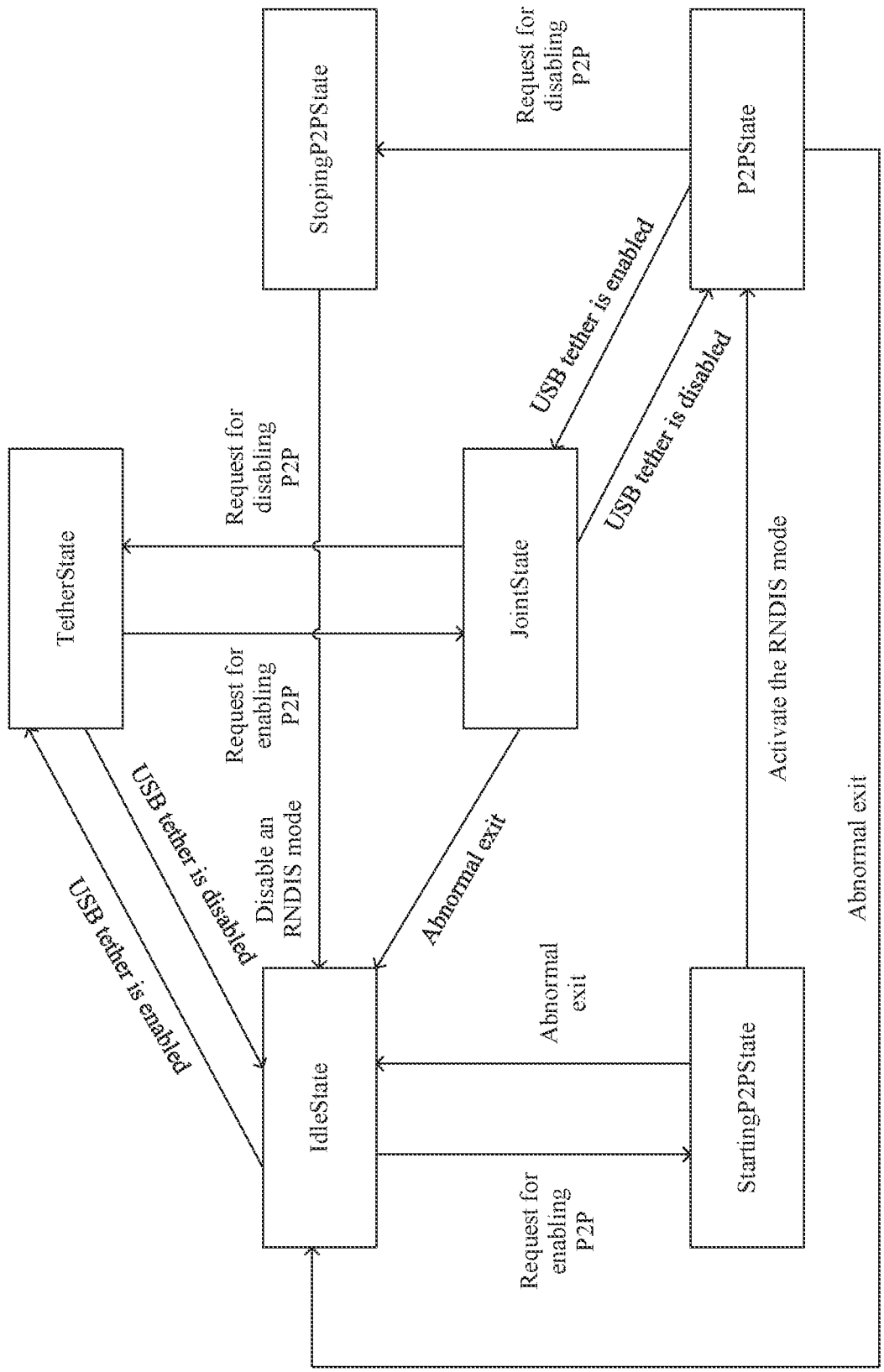
FIG. 10 is a schematic diagram of a relationship between states managed by a state machine manager in a USB P2P module in a mobile phone shown in FIG. 8.

FIG. 10 shows switching between several states.

IdleState (Initial state) indicates an initial state of a system, that is, a parent state of all states. That is, a USB P2P state and a USB tethering state are not enabled.

StartingP2pState [Start a USB P2P state] indicates to attempt to start a USB P2P state, and a USB P2P mode is enabled.

P2pState [USB P2P is successfully enabled] indicates that a USB P2P mode is already in an activated state, that is, a mobile phone is already in a state in which IP layer communication can be performed between the mobile phone and a notebook computer in the USB P2P mode and a mobile network is not shared.

TetherState [Network sharing state] indicates that a USB tethering mode is enabled, that is, a mobile network sharing state is enabled, and no service is applied for using the USB P2P.

JointState [Collaboration state] indicates modes are in a collaboration state. That is, a USB network sharing function is enabled and other services apply for using the USB P2P.

StoppingP2pState [Apply for disabling a USB P2P state] indicates to attempt to exit a USB P2P state, indicating that all applications using USB P2P have ended and attempted to exit.

Referring to FIG. 10, it can be learned that, when the mobile phone is in the IdleState, if a service requests enabling of the USB P2P mode, the mobile phone enters the StartingP2pState, and a state machine manager records the state. To finally enable the USB P2P mode, the state machine manager notifies a connectivity manager that the current state is StartingP2pState, then the connectivity manager notifies a USB network setting module to set a USB module to an RNDIS mode (that is, activate the RNDIS mode), a network manager allocates IP addresses, and the connectivity manager correspondingly sets a forwarding rule, to activate the P2pState, and the state machine manager further records that the USB of the mobile phone is in the P2pState.

In the P2pState, when all applications that apply for the USB P2P mode have ended processes, the connectivity manager sends a request for disabling the USB P2P mode, to enter the StoppingP2pState. In this state, it can be learned with reference to the foregoing description that, after receiving the notification that the state machine manager notifies that the current state is StoppingP2pState, the connectivity manager notifies the USB management module to disable the RNDIS mode of the USB, to return to the IdleState. In this way, a process from the initial state to enabling the USB P2P state, to activating the USB P2P model, to the application for exiting the USB P2P mode, and finally to the initial state is implemented.

In addition, in the P2pState, when the USB tethering mode needs to be enabled according to a service requirement, the state machine manager notifies the connectivity manager of a current state (that is, the P2pState), and the connectivity manager directly sets the forwarding rule to enable the USB tethering mode, and therefore enters the JointState, that is, enters a state in which the USB P2P mode and the USB tethering mode are simultaneously activated.

In addition, it can be learned from FIG. 10 that, in the JointState, when the USB P2P mode is attempted to be disabled, the state machine manager notifies the connectivity manager that the USB P2P mode is in the JointState at this time. Based on state information, when receiving a request for disabling the USB P2P mode, the connectivity manager does not enter the StoppingP2pState as described above, but directly enters the TetherState. Actually, the connectivity manager does not indicate the USB management module to change the mode of the USB module, and the connectivity manager does not change the forwarding rule. In other words, at this time, the bottom layer of the system does not change, but the setting module shows that the USB P2P mode is disabled, and the mobile phone is currently in the activated USB tethering state, that is, the TetherState.

In addition, in the JointState, when the USB tethering mode is attempted to be disabled, the state machine manager notifies the connectivity manager that the USB tethering mode is in the JointState at this time. Based on state information, when receiving a request for disabling the USB tethering mode, the connectivity manager does not notify to disable the RNDIS mode of the USB module, but directly enters the P2PState. In other words, the connectivity manager does not indicate the USB management module to change the mode of the USB module, but only changes the forwarding rule. In other words, at this time, the bottom layer of the system only disables the path for the USB to forward the received data packet to the mobile communications module, and the setting module shows that the USB tethering mode is disabled, and the mobile phone is currently in the activated USB P2P state, that is, the P2PState.

In addition, there is also a case in which the application that applies for enabling the USB P2P mode is refused that is, the application exits abnormally. In this case, the application directly returns to the IdleState, and the state machine manager directly records the state of the USB module as the IdleState. On this basis, corresponding setting is performed according to a new application request or a request for enabling sent by the setting module.

It can be learned from the foregoing description that, by introducing the state machine manager, the current state of the USB is reported to the connectivity manager in time, so that the connectivity manager can avoid incorrectly indicating the USB management module to disable the RNDIS mode of the USB module, thereby effectively avoiding a conflict between the two states, enabling the bottom layer of the system to be in an integrated state, and further improving user experience.

Figure 11:
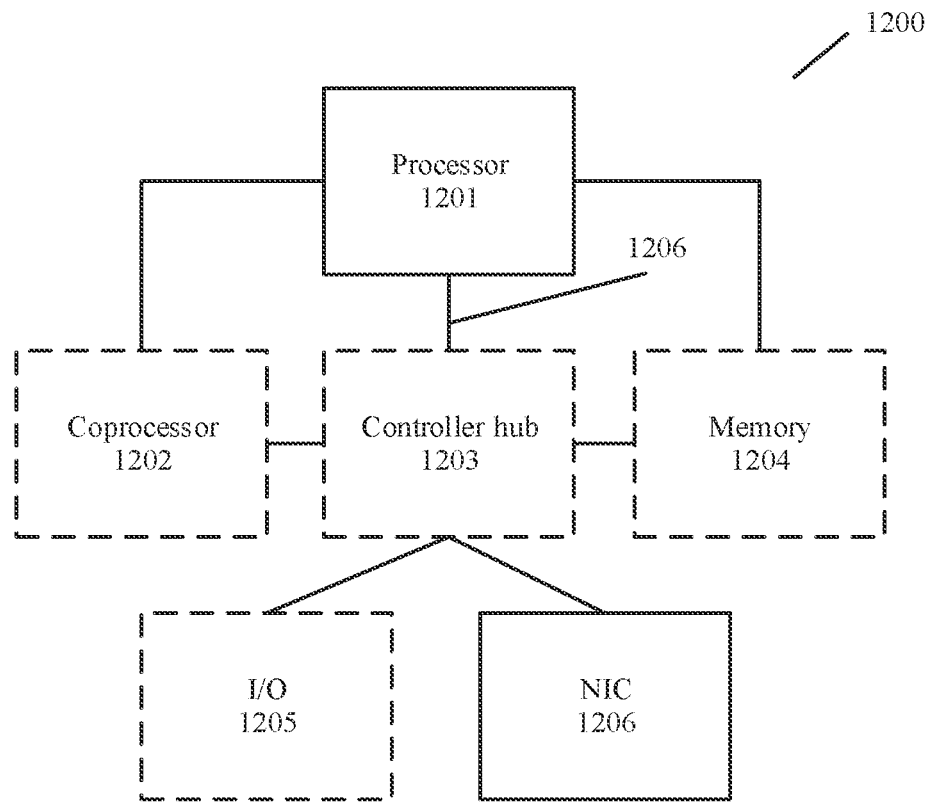
FIG. 11 is a block diagram of a device according to some embodiments of this application.

Referring to FIG. 11, the following describes a device 1200 (for example, a mobile phone) in an embodiment of this application. FIG. 11 is a block diagram of a device 1200 according to an embodiment of this application. The device 1200 may include one or more processors 1201 coupled to a controller hub 1203. For at least one embodiment, the controller hub 1203 communicates with the processor 1201 by using a multi-wire bus such as a front side bus (Front Side Bus, FSB), a point-to-point interface such as a quick path interconnect (Quick Path Interconnect, QPI) interface, or a similar connection 1206. The processor 1201 executes instructions for controlling a general type of data processing operation. In an embodiment, the controller hub 1203 includes, but is not limited to, a graphics memory controller hub (Graphics Memory Controller Hub, GMCH) (not shown) and an input/output hub (Input Output Hub, IOH) (which may be on a separate chip) (not shown). The GMCH includes a memory and a graphics controller, and is coupled to the IOH.

Figure 12:
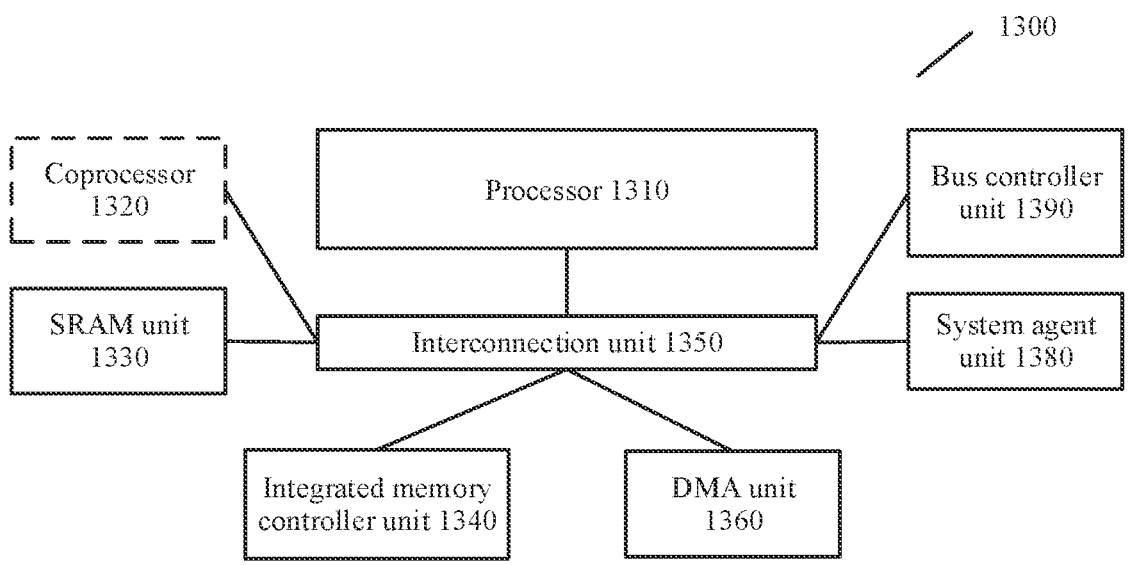
FIG. 12 is a block diagram of a system-on-a-chip (SoC) according to some embodiments of this application.

The device 1200 may further include a coprocessor 1202 and a memory 1204 that are coupled to the controller hub 1203. Alternatively, one or both of the memory and the GMCH may be integrated into a processor (as described in this application). The memory 1204 and the coprocessor 1202 are directly coupled to the processor 1201 and the controller hub 1203. The controller hub 1203 and the IOH are located in a single chip. The memory 1204 may be, for example, a dynamic random access memory (Dynamic Random Access Memory, DRAM), a phase change memory (Phase Change Memory, PCM), or a combination thereof. In an embodiment, the coprocessor 1202 is an application-specific processor, for example, a high-throughput MIC (Many Integrated Core, MIC) processor, a network or communications processor, a compression engine, a graphics processing unit, a general-purpose computing on graphics processing unit (General-Purpose Computing on GPU, GPGPU), or an embedded processor. An optional property of the coprocessor 1202 is shown in FIG. 12 in dashed lines.

As a computer-readable storage medium, the memory 1204 may include one or more tangible and non-transitory computer-readable media that are used to store data and/or instructions. For example, the memory 1204 may include any suitable nonvolatile memory such as a flash memory and/or any suitable nonvolatile storage device, for example, one or more hard-disk drives (Hard-Disk Drive, HDD (s)), one or more compact disc (Compact Disc, CD) drives, and/or one or more digital versatile disc (Digital Versatile Disc, DVD) drives.

In an embodiment, the device 1200 may further include a network interface (Network Interface Controller, NIC) 1206. The network interface 1206 may include a transceiver, configured to provide a radio interface for the device 1200, to communicate with any another suitable device (such as a front-end module or an antenna). In various embodiments, the network interface 1206 may be integrated with another component of the device 1200. The network interface 1206 may implement a function of a communications unit in the foregoing embodiments.

The device 1200 may further include an input/output (Input/Output, I/O) device 1205. The I/O 1205 may include: a user interface designed to enable a user to interact with the device 1200; a peripheral component interface designed to enable a peripheral component to interact with the device 1200; and/or a sensor designed to determine an environmental condition and/or location information related to the device 1200.

It should be noted that FIG. 11 is merely an example. To be specific, although FIG. 11 shows that the device 1200 includes a plurality of components such as the processor 1201, the controller hub 1203, and the memory 1204, in actual application, a device using the methods in this application may include only some of the components of the device 1200, for example, may include only the processor 1201 and the NIC 1206. In FIG. 11, properties of the optional components are shown by using dashed lines.

According to some embodiments of this application, the memory 1204 used as a computer-readable storage medium stores an instruction. When the instruction is executed on a computer, the device 1200 performs the method for connection between devices according to the foregoing embodiment. For details, refer to the method in the foregoing embodiment. Details are not described herein again.

FIG. 12 is a block diagram of an SoC (System on Chip, system on chip) 1300 according to an embodiment of this application. In FIG. 12, similar components have a same reference numeral. In addition, a dashed-line box is an optional feature of a more advanced SoC. In FIG. 12, the SoC 1300 includes an interconnection unit 1350 coupled to an application processor 1310, a system agent unit 1380, a bus controller unit 1390, an integrated memory controller unit 1340, one group of or one or more coprocessors 1320, which may include integrated graphics logic, an image processor, an audio processor, and a video processor, a static random access memory (Static Random Access Memory, SRAM) unit 1330, and a direct memory access (DMA) unit 1360. In an embodiment, the coprocessor 1320 includes an application-specific processor, for example, a network or communication processor, a compression engine, a GPGPU, a high-throughput MIC processor, or an embedded processor.

The static random access memory (SRAM) unit 1330 may include one or more computer-readable media for storing data and/or instructions. The computer-readable storage medium may store instructions, and specifically, store temporary and permanent copies of the instructions. The instruction may include: when being executed by at least one unit in the processor, the instruction enables the SoC 1300 to perform the method according to the foregoing embodiment. For details, refer to the method in the foregoing embodiment. Details are not described herein again.

Embodiments of a mechanism disclosed in this application may be implemented in hardware, software, firmware, or a combination of these implementations. The embodiments of this application may be implemented as a computer program or program code executed in a programmable system. The programmable system includes at least one processor, a storage system (including a volatile memory, a nonvolatile memory, and/or a storage element), at least one input device, and at least one output device.

The program code may be configured to input instructions, to perform functions described in this application and generate output information. The output information may be applied to one or more output devices in a known manner. For a purpose of this application, a processing system includes any system that has a processor such as a digital signal processor (Digital Signal Processor, DSP), a microcontroller, an application-specific integrated circuit (Application-Specific Integrated Circuit, ASIC), or a microprocessor.

The program code may be implemented in a high-level procedural language or an object-oriented programming language, to communicate with the processing system. The program code may alternatively be implemented by using an assembly language or a machine language when needed. Actually, the mechanisms described in this application are not limited to a scope of any particular programming language. In any case, the language may be a compiled language or an interpretive language.

In some cases, the disclosed embodiments may be implemented by hardware, firmware, software, or any combination thereof. The disclosed embodiments may be alternatively implemented as instructions carried by or stored on one or more temporary or non-temporary machine-readable (for example, computer-readable) storage media, and the instructions may be read and executed by one or more processors. For example, the instructions may be distributed through a network or another computer-readable medium. Therefore, the machine-readable medium may include any medium for storing or transmitting information in a machine-readable (for example, computer-readable) medium. The machine-readable medium includes but is not limited to a floppy disk, a compact disc, an optical disc, a compact disc read-only memory (Compact Disc Read-Only Memory, CD-ROMs), a magneto-optical disc, a read-only memory (Read-Only Memory, ROM), a random access memory (RAM), an erasable programmable read-only memory (Erasable Programmable Read-Only Memory, EPROM), an electrically erasable programmable read-only memory (Electrically Erasable Programmable Read-Only Memory, EEPROM), a magnetic or an optical card, a flash memory, or a tangible machine-readable memory that is configured to transmit information through Internet by using electricity, light, sound or another form of propagating signal (for example, carrier, an infrared signal, or a digital signal). Therefore, the machine-readable medium includes any type of machine-readable medium that is suitable for storing or transmitting electronic instructions or information in a machine-readable (for example, a computer-readable) form.

In the accompanying drawings, some structural or method features may be shown in a particular arrangement and/or order. However, it should be understood that such a particular arrangement and/or order may not be required. In some embodiments, these features may be arranged in a manner and/or order different from that shown in the accompanying drawings of the specification. In addition, inclusion of the structural or method features in a particular figure does not imply that such features are required in all embodiments, and in some embodiments, these features may not be included or may be combined with other features.

It should be noted that all units/modules mentioned in the device embodiments of this application are logical units/modules. Physically, one logical unit/module may be one physical unit/module, or may be a part of one physical unit/module, or may be implemented by a combination of a plurality of physical units/modules. Physical implementations of these logical units/modules are not the most important, and a combination of functions implemented by these logical units/modules is a key to resolving technical problems proposed in this application. In addition, to highlight an innovative part of this application, a unit/module that is not closely related to resolving the technical problems proposed in this application is not introduced in the foregoing device embodiments of this application. This does not indicate that there is not another unit/module in the foregoing device embodiments.

It should be noted that, in the examples and the specification of this patent, relational terms such as first and second are only used to distinguish one entity or operation from another entity or operation, and do not necessarily require or imply that any actual relationship or sequence exists between these entities or operations. Moreover, the terms "include", "including", or any other variant thereof is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a" does not, without more constraints, preclude the presence of additional identical elements in the process, method, article, or device that includes the element.

Although this application has been illustrated and described with reference to some preferred embodiments of this application, persons of ordinary skill in the art should understand that the foregoing descriptions are merely specific implementations of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method implemented by a first electronic device and comprising:
    establishing a connection with a second electronic device through a Universal Serial Bus (USB) cable;
    enabling a first connection mode to perform Internet Protocol (IP) layer connection between the first electronic device and the second electronic device;
    allocating IP addresses to the first electronic device and the second electronic device while in the first connection mode;
    receiving, by a USB system of the first electronic device, data from the second electronic device while in the first connection mode; and
    disabling transmission of the data to a mobile communications system of the first electronic device while in the first connection mode;
    receiving a first request for enabling a second connection mode, wherein the second connection mode is configured to share a mobile network of the first electronic device with the second electronic device; and
    enabling the data to be transmitted to the mobile communications system while in the second connection mode.

2. The method of claim 1, further comprising further allocating, by the USB system and based on a Dynamic Host Configuration Protocol (DHCP) function, the IP addresses to the first electronic device and the second electronic device.

3. The method of claim 2, further comprising:
    enabling the USB system to work in a Remote Network Driver Interface Specification (RNDIS) mode to virtualize the first electronic device into a network adapter; and
    allocating, based on the DHCP function, the IP addresses to the USB system before allocating, by the USB system, the IP addresses to the first electronic device and the second electronic device.

4. The method of claim 1, wherein the first electronic device comprises any one of a mobile phone or a tablet computer.

5. The method of claim 1, wherein disabling transmission of the data to the mobile communications system comprises setting a forwarding rule.

6. The method of claim 1, further comprising:
    displaying an option for enabling the first connection mode;
    receiving an operation on the option; and
    further enabling, in response to receiving the operation, the first connection mode.

7. The method of claim 1, further comprising:
    receiving, from at least one application running on the first electronic device, a second request; and further enabling, based on the second request, the first connection mode.

8. The method of claim 7, further comprising disabling the first connection mode after a last application of a plurality of applications requesting enabling of the first connection mode is disabled.

9. The method of claim 8, further comprising:
recording a first identifier of each of the applications requesting enabling to create a list;
identifying that a process of a first application that corresponds to a second identifier that is located in the list ends;
removing, in response to identifying that the process ends, the second identifier from the list; and
further disabling the first connection mode when the list does not comprise any first identifiers.

10. The method of claim 1, further comprising:
disabling all applications requesting enabling of the first connection mode;
detecting whether the second connection mode is in an enabled state; and
setting, in response to the second connection mode being in the enabled state, the USB system as a virtual network adapter until the second connection mode is disabled.

11. The method of claim 1, further comprising switching between the first connection mode and the second connection mode based on a third request of a running application.

12. A first electronic device comprising:
a memory configured to store instructions; and
one or more processors coupled to the memory and configured to execute the instructions to cause the first electronic device to:
establish a connection with a second electronic device through a Universal Serial Bus (USB) cable;
enable a first connection mode to perform Internet Protocol (IP) layer connection between the first electronic device and the second electronic device;
allocate IP addresses to the first electronic device and the second electronic device while in the first connection mode;
receive, by a USB system of the first electronic device, data from the second electronic device while in the first connection mode;
disable transmission of the data to a mobile communications system of the first electronic device while in the first connection mode;
receive a first request for enabling a second connection mode, wherein the second connection mode is configured to share a mobile network of the first electronic device with the second electronic device; and
enable the data to be transmitted to the mobile communications system while in the second connection mode.

13. The first electronic device of claim 12, wherein the one or more processors are further configured to execute the instructions to cause the first electronic device to allocate, by the USB system and based on a Dynamic Host Configuration Protocol (DHCP) function, the IP addresses to the first electronic device and the second electronic device.

14. The first electronic device of claim 13, wherein the one or more processors are further configured to execute the instructions to cause the first electronic device to:
enable the USB system to work in a Remote Network Driver Interface Specification (RNDIS) mode to virtualize the first electronic device into a network adapter; and
allocate the IP addresses to the USB system based on the DHCP function before allocating, by the USB system, the IP addresses to the first electronic device and the second electronic device.

15. The first electronic device of claim 12, wherein the one or more processors are further configured to execute the instructions to cause the first electronic device to:
display an option for enabling the first connection mode;
receive an operation on the option; and
further enable, in response to receiving the operation, the first connection mode.

16. The first electronic device of claim 12, wherein the one or more processors are further configured to execute the instructions to cause the first electronic device to:
disable all applications requesting enabling of the first connection mode;
detect whether the second connection mode is in an enabled state; and
set, in response to the second connection mode being in the enabled state, the USB system as a virtual network adapter until the second connection mode is disabled.

17. The first electronic device of claim 12, wherein the one or more processors are further configured to execute the instructions to cause the first electronic device to switch between the first connection mode and the second connection mode based on a second request of a running application.

18. A computer program product comprising computer-executable instructions that are stored on a non-transitory computer-readable storage medium and that, when executed by one or more processors, cause a first electronic device to:
establish a connection with a second electronic device through a Universal Serial Bus (USB) cable;
enable a first connection mode to perform Internet Protocol (IP) layer connection between the first electronic device and the second electronic device;
allocate IP addresses to the first electronic device and the second electronic device while in the first connection mode;
receive, by a USB system of the first electronic device, data from the second electronic device while in the first connection mode;
disable transmission of the data to a mobile communications system of the first electronic device while in the first connection mode;
receive a first request for enabling a second connection mode, wherein the second connection mode is configured to share a mobile network of the first electronic device with the second electronic device; and
enable the data to be transmitted to the mobile communications system while in the second connection mode.

19. The computer program product of claim 18, wherein the one or more processors are further configured to execute the instructions to cause the first electronic device to:
disable all applications requesting enabling of the first connection mode;
detect whether the second connection mode is in an enabled state; and
set, in response to the second connection mode being in the enabled state, the USB system as a virtual network adapter until the second connection mode is disabled.

20. The computer program product of claim 18, wherein the one or more processors are further configured to execute the instructions to cause the first electronic device to switch between the first connection mode and the second connection mode based on a second request of a running application.

\* \* \* \* \*